(12) United States Patent
Madhivanan et al.

(10) Patent No.: US 11,274,930 B1
(45) Date of Patent: Mar. 15, 2022

(54) SYSTEM FOR ASSESSING AN AUTONOMOUSLY DETERMINED MAP

(71) Applicant: AMAZON TECHNOLOGIES, INC., Seattle, WA (US)

(72) Inventors: Rajasimman Madhivanan, Sunnyvale, CA (US); Heidi Christine Schubert, Palo Alto, CA (US); Chang Young Kim, Newark, CA (US); Madan Jayaprakasam, Fremont, CA (US); Madhav Achar, Troy, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 152 days.

(21) Appl. No.: 16/710,935

(22) Filed: Dec. 11, 2019

(51) Int. Cl.
*G01C 21/32* (2006.01)
*G01C 21/30* (2006.01)
*G01C 21/20* (2006.01)
*B60W 60/00* (2020.01)
*G05D 1/00* (2006.01)

(52) U.S. Cl.
CPC ........... *G01C 21/32* (2013.01); *B60W 60/001* (2020.02); *G05D 1/0088* (2013.01)

(58) Field of Classification Search
CPC ........ G01C 21/32; G01C 21/30; G01C 21/36; G01C 21/10; G01C 21/20; B26J 9/16; G05D 1/00; G05D 1/0265; G08G 1/00; G06T 17/05; G01B 11/04; G06K 9/62; G06K 9/6215; G06F 3/0488; G06F 3/011; B25J 9/161; A24C 5/3412
See application file for complete search history.

(56) References Cited

U.S. PATENT DOCUMENTS

| | | | | |
|---|---|---|---|---|
| 10,139,821 | B2 * | 11/2018 | Yamamura | G05D 1/0265 |
| 10,408,628 | B2 * | 9/2019 | Stess | G06K 9/6215 |
| 10,922,969 | B2 * | 2/2021 | Song | G08G 1/207 |
| 2008/0228395 | A1 * | 9/2008 | Kobori | G01S 19/48 701/8 |
| 2013/0054137 | A1 * | 2/2013 | Arai | G01C 21/32 701/457 |
| 2013/0342671 | A1 * | 12/2013 | Hummel | G06F 3/011 348/77 |
| 2014/0085245 | A1 * | 3/2014 | Baldwin | G06F 3/0488 345/174 |
| 2016/0375583 | A1 * | 12/2016 | Roh | B25J 9/1694 700/258 |

(Continued)

*Primary Examiner* — Yuri Kan
(74) *Attorney, Agent, or Firm* — Lindauer Law, PLLC

(57) ABSTRACT

An autonomous mobile device (AMD) uses sensors to explore a physical space and determine a map indicating the locations of obstacles. As data is later acquired, the map may be updated, resulting in changes to previously mapped obstacle positions. Navigability tests determine if a path can be found between a current location and a previously visited location. A failure to find a path may result in exploration of an area that includes the previously visited location. Submaps may be produced by the AMD as it moves through the physical space. An accuracy score of a selected submap is determined by comparing the selected submap with a partial global map created using submaps other than the selected submap. If the accuracy score is less than a threshold value, the selected submap may be discarded and an area in the physical space associated with the selected submap may be re-explored.

20 Claims, 7 Drawing Sheets

(56) References Cited

U.S. PATENT DOCUMENTS

| | | | | |
|---|---|---|---|---|
| 2017/0124862 A1* | 5/2017 | Sakai | ................. | G01C 21/20 |
| 2017/0307386 A1* | 10/2017 | Stess | .................. | G06K 9/6215 |
| 2018/0372482 A1* | 12/2018 | Consolante | ......... | A24C 5/3412 |
| 2019/0228571 A1* | 7/2019 | Atsmon | ............... | G06T 19/006 |
| 2020/0191601 A1* | 6/2020 | Jiang | ..................... | G01S 17/89 |
| 2020/0376676 A1* | 12/2020 | Eoh | ........................ | B25J 9/161 |

\* cited by examiner

US 11,274,930 B1

SYSTEM FOR ASSESSING AN AUTONOMOUSLY DETERMINED MAP

BACKGROUND

An autonomous mobile device (AMD) moves throughout a physical space. To facilitate this movement, the AMD gathers information about the physical space to determine where obstacles are located and builds a map with this information.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
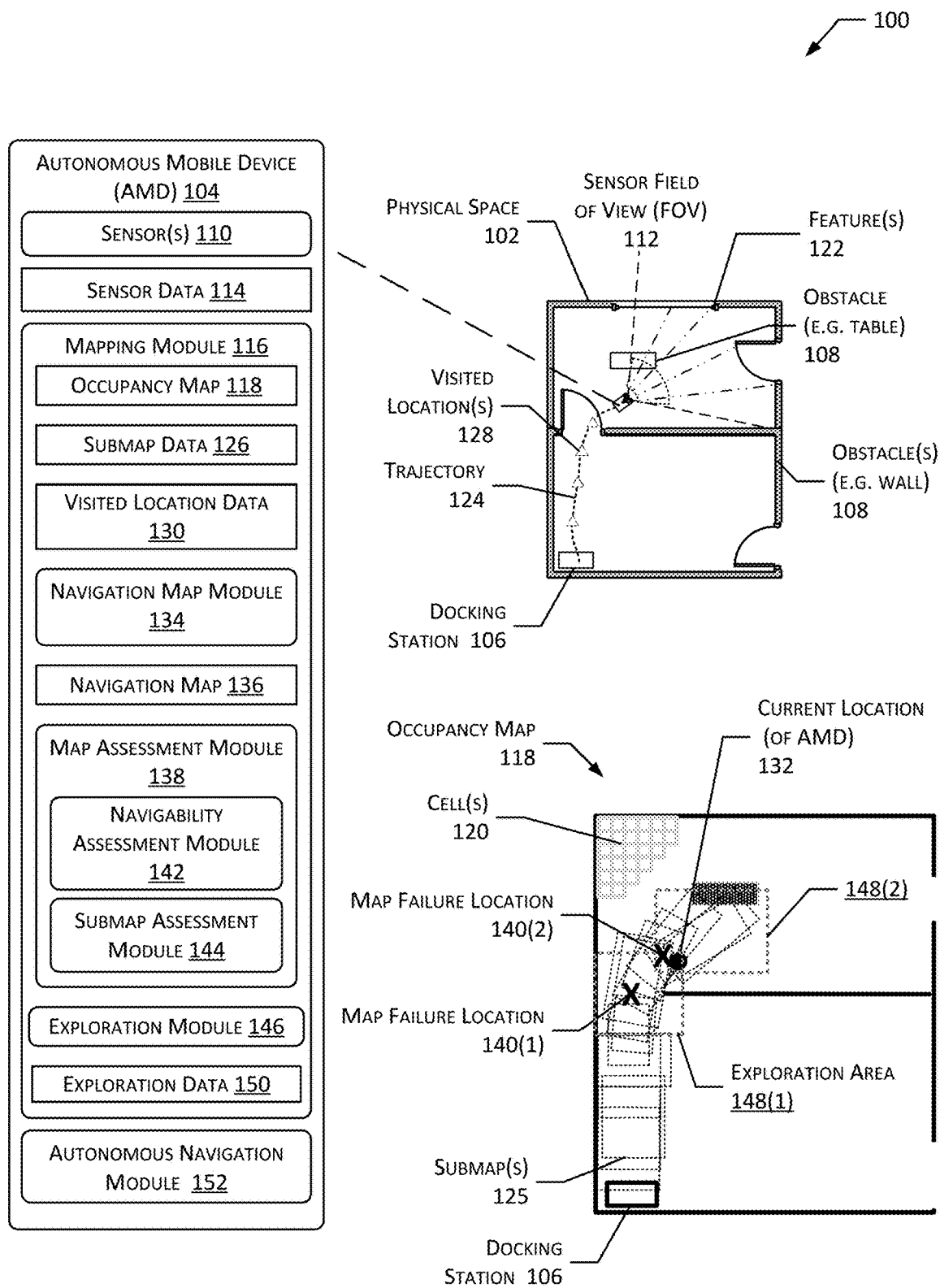
FIG. 1 illustrates a system for assessing an autonomously determined map of a physical space for use by an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD needs to have information about where obstacles are in the physical space. This information is used to plan a path for the AMD to traverse, to avoid collisions with obstacles, and so forth. For example, the AMD should be able to move from a first location to a second location while avoiding collisions with furnishings, walls, people, falling down stairs, and so forth.

An occupancy map is determined using sensor data from one or more sensors and provides information about where obstacles are in the physical space. The occupancy map comprises cells in a specified arrangement, a grid of cells. Each cell is associated with a particular location in the physical space. For example, each cell may represent an area in the physical space that is 5 centimeters (cm) by 5 cm. Each cell may also be associated with an occupancy value that indicates whether the particular area in the physical space associated with that cell is occupied by an obstacle, unoccupied, or unknown. For ease of discussion, and not necessarily as a limitation, description with regard to cells may refer to the data associated with the cells or, as appropriate, the physical space associated with the cell. For example, an action such as moving to a cell may comprise moving the AMD to the physical space associated with the cell.

The sensors on the AMD or sensors in the physical space acquire the sensor data. The sensor data is processed to determine information such as a current location of the AMD in the physical space and to provide the information that is used to determine the occupancy map. The sensors exhibit various limitations, including a particular field of view (FOV), working range, may require line of sight to operate, exhibit blind spots, and so forth. Except for very unusual circumstances such as very simple physical spaces, the sensors are not able to simultaneously see all of the areas in the physical space. As a result, the AMD gathers information about the physical space by moving and directing the FOV of the sensors in different directions. This information may be used to determine the occupancy map.

As the AMD moves through the physical space, it may determine where it is and how far it has moved. For example, one technique is known as simultaneous localization and mapping (SLAM). Localization is determining where the AMD is in the physical space. A vision-based SLAM system may use images acquired by cameras on the AMD. These images are processed to determine the presence of features in the images, such as edges of doors, shadows on the wall, and so forth. A descriptor is information that describes a particular feature. Various techniques such a scale-invariant feature transform (SIFT) may be used to characterize the features and generate the descriptors. The SLAM may use data from other sensors such as motor encoders, inertial measurement units (IMU) with one or more accelerometers and gyroscopes, and so forth.

While the AMD is moving and SLAM is operating, SLAM provides as output a series of poses, each pose describing a location and rotations in space that are based at least in part on the apparent motion of observed features in the images. For example, a pose may comprise information about six dimensions (6D), that of three orthogonal axes and corresponding rotations about those axes. These poses may be combined to provide a trajectory of the AMD. The poses may represent visited locations in the physical space.

While the AMD is moving, other sensors are acquiring information about the physical space. One or more depth sensors may acquire depth data about the presence or absence of obstacles in the physical space. For example, the depth sensors may comprise a time-of-flight (TOF) depth camera, ultrasound, radar, and so forth. The depth data provided by a depth sensor is indicative of whether an obstacle is detected or not, and also includes information about the distance between the sensor and the obstacle and the relative direction with respect to the sensor of an obstacle, if detected. The depth data, as with any sensor data, includes some uncertainty.

During operation of the AMD, various factors introduce uncertainty into the resulting poses. These factors may include sensor noise, changing lighting conditions that change the appearance of features in images, dynamic obstacles such as people moving through the physical space, and so forth. This uncertainty may manifest as apparent drift of the poses with respect to the physical space. As the AMD moves through the physical space, the uncertainty accumulates. For example, if the AMD starts at a docking station, moves around a home, and returns to that docking station, due to drift the AMD would determine that the location of the docking station has changed even though the docking station has remained stationary. This uncertainty may also manifest as apparent changes or differences in where an obstacle appears to be from one observation to another.

To address this issue, SLAM of the AMD may utilize a technique known as loop closure. With loop closure, the AMD recognizes it has returned to a previously visited area, thus "closing a loop" that returns the AMD to about the same place in the physical space. An assumption can be made that fixed objects have not been moved since the last visit. The loop closure process provides an updated trajectory which attempts to correct for drift. These loop closure operations result in changes or shifts to the occupancy map that has been developed so far. For example, while the actual obstacles in the physical space may have remained stationary, a wall may shift from one set of coordinates to another between successive versions of an occupancy map.

The AMD may attempt to determine an occupancy map that is representative of the physical space. For example, the AMD may perform an exploration process in which the AMD moves through the physical space and attempts to generate an occupancy map. However, once the occupancy map has been deemed to be finished and a first session of exploration completes, how will that occupancy map be kept up-to-date? In addition to all the factors mentioned above, objects in the physical space may move. For example, furniture may be moved around, new objects may be placed in the physical space by a user, and so forth. As a result of these and other factors, the occupancy map of the physical space is likely to change, either due to data processing, physical changes, or both.

With the dynamic environment, several issues become apparent. How often should the AMD explore the physical space? How much of the physical space should be explored? What should be done if the sensor data indicates a difference between data acquired at a first time and data acquired at a second time? These are significant issues and traditional systems have not adequately addressed these. For example, traditional systems of performing a complete re-exploration of the physical space on a regular basis consume significant amounts of time, consume computational resources, prevent the device from being available for other tasks, are intrusive to users, and so forth.

Described in this disclosure are techniques and systems that allow an autonomous mobile device (AMD) to automatically assess an occupancy map, or portion thereof. If an assessment indicates that a portion of the occupancy map fails an assessment, an area in the physical space associated with that portion may be subsequently explored. During exploration, sensor data is acquired and potential updates to the occupancy map are determined. Those potential updates may also be assessed, and changes that pass the assessment may be used to update the occupancy map.

A navigability assessment tests the occupancy map against visited location data. The visited location data comprises information about where the AMD has been in the physical environment. For example, the visited location data may comprise a plurality of visited locations from the poses in the trajectory data. The AMD has previously been at each of those visited locations at some time in the past. It may be assumed that because the AMD was able to get to those visited locations, it should be able to navigate to any of those visited locations at some points in the future. If the AMD is unable to navigate to some threshold number of previously visited locations, the portion of the occupancy map that encompasses those locations may be designated as an exploration area and subsequently re-explored.

A submap assessment tests whether a particular submap is sufficiently consistent with previously acquired data. While the AMD is moving, it may generate submaps. A submap encompasses a portion of the physical space that is less than a total occupancy map. For example, the submap may comprise a two square meter area in a 100 square meter home. Submaps may be generated at specified intervals of time, distance traveled, rotation, and so forth.

An assumption may be made that most changes in the physical space are relatively minor. Incorrect data in a submap, misalignment, or other issues may result in the submap incorrectly representing the physical space. The second assessment determines a submap accuracy score by comparing a first submap with an occupancy map that is determined from submaps other than the first submap. For example, a comparison may be made between observed cells, with unknown cells disregarded. If the submap accuracy score is greater than a threshold value, the submap may be deemed accurate and used to update the occupancy map. If the submap accuracy score is less than the threshold value, the area associated with the first submap may be designated as an exploration area and subsequently re-explored.

By using the techniques described in this disclosure, the AMD or another computing device, is able to quickly and efficiently assess an occupancy map or portion thereof such as a submap. Areas in the physical space that exhibit inconsistencies may be targeted for exploration. As a result, once an initial occupancy map has been generated, it may be maintained and updated much more efficiently. Time spent, power consumption, and consumption of computational resources are all significantly reduced compared to traditional techniques. Additionally, lengthy or unnecessary re-exploration of the physical space is reduced, improving the user experience by increasing the availability of the AMD to perform tasks for the user.

Illustrative System

FIG. 1 illustrates a system 100 for assessing an autonomously determined map of a physical space 102 for use by an autonomous mobile device (AMD) 104, according to some implementations.

The AMD 104 is shown in the physical space 102. A docking station 106 may also be present in the physical space 102. The AMD 104 may be configured to dock with or connect to the docking station 106. The docking station

106 may provide a known point in the physical space 102 to which the AMD 104 may return, electrical power, communications, or other functions.

One or more obstacles 108 may be present within the physical space 102. For example, obstacles 108 may comprise walls, furnishings, stair wells, people, and so forth. Obstacles 108 may be static, quasi-static, or dynamic. For example, a wall that does not move is a static obstacle. In comparison, a door that swings between open and closed states is a quasi-static obstacle 108. A dynamic obstacle might be a toy car that may move from one location to another.

The AMD 104 may include one or more sensors 110. For example, the sensors 110 may include cameras, microphones, time-of-flight (TOF) sensors, LIDAR, and so forth. Different sensors 110 may have different sensor fields of view (FOV) 112. For example, a first sensor FOV 112 for a pair of cameras is depicted as is a second (closer) sensor FOV 112 for a time-of-flight depth sensor. During operations, the sensors 110 provide sensor data 114. For example, the cameras may provide image data comprising one or more images of the physical space 102. The sensors 110 are discussed in more detail with regard to FIG. 4.

While moving from one location to another, the AMD 104 needs to determine where it is at a given time, determine the location of obstacles 108, and move while avoiding collisions with any of these obstacles 108. A command to move may be the result of input from the user, a previously scheduled task, a response to input from one or more sensors 110, a command from an external computing device, or another source.

A mapping module 116 determines a representation of the physical space 102 that includes the obstacles 108 and their locations in the physical space 102. This representation may comprise an occupancy map 118. The occupancy map 118 may comprise data that indicates the location of one or more obstacles 108, such as a table, wall, stairwell, and so forth. In some implementations, the occupancy map 118 may comprise a plurality of cells 120 with each cell 120 of the plurality of cells 120 representing a particular area in the physical space 102. Data, such as occupancy values, may be stored that indicates whether an area of the physical space 102 associated with the cell 120 is unobserved, occupied by an obstacle 108, or is unoccupied. An obstacle 108 may comprise an object or feature that prevents or impairs traversal by the AMD 104. For example, an obstacle 108 may comprise a wall, stairwell, and so forth.

The occupancy map 118 may be manually or automatically determined. For example, during a learning phase the user may take the AMD 104 on a tour of the physical space 102, allowing the mapping module 116 of the AMD 104 to determine submap data 126 described below. The user may provide input data such as tags designating a particular obstacle type, such as "furniture" or "fragile". In another example, during subsequent operation, the AMD 104 may generate the occupancy map 118 that is indicative of locations and types of obstacles such as chairs, doors, stairwells, and so forth as it moves unattended through the physical space 102. In some implementations, an exploration module 146 as described below may be used to determine the occupancy map 118.

During operation, the mapping module 116 uses the sensor data 114 from various sensors 110 to determine information such as where the AMD 104 is, how far the AMD 104 has moved, the presence of obstacles 108, where those obstacles 108 are, and so forth.

The mapping module 116 may use a simultaneous localization and mapping (SLAM) module. Localization is determining where the AMD 104 is in the physical space 102 and may utilize an external reference. The sensors 110 include one or more cameras which acquire the image data comprising one or more images. These images are processed to determine feature data that is indicative of, and characterizes, features 122 in the images, such as edges of doors, shadows on the wall, texture on the walls, and so forth.

A descriptor is information that describes a particular feature 122 or set of features 122. Various techniques such as a scale-invariant feature transform (SIFT), speeded up robust features (SURF), a trained convolutional neural network, and so forth may be used to characterize the features 122 and generate the descriptors. For example, the descriptor may comprise data indicative of the feature 122 with respect to 256 different dimensions. Descriptors regarding the features 122 present in a given image or set of images in the image data may be stored as feature data. In one implementation, the descriptors may include information about the relative placement, with respect to the image, of a particular feature 122. In another implementation, the feature data may comprise a graph that describes a relationship of the apparent location of features 122 with respect to one another in a given image or set of image data.

Because the feature data represents the features 122 seen by the camera that is at a particular location in the physical space 102 and pointed in a particular direction, the feature data is associated with a particular location in the physical space 102 and corresponding orientation of the camera. The features 122 in the feature data are thus associated with a particular location in the physical space 102, and vice versa. As described below, a particular location in the physical space 102 may be described with respect to the features 122.

The feature data may be representative of features 122 observed with different types or levels of illumination. For example, the feature data may be determined by acquiring and processing a first image with first illumination and a second image with second illumination. The first and second illumination may differ in one or more of intensity or type.

The AMD 104 may move through the physical space 102. The motion of the AMD 104 may be described as a trajectory 124, such as shown here. In some implementations the trajectory 124 may comprise a series of poses. Each pose may be indicative of a particular location with respect to a plurality of orthogonal axes and rotation with respect to individual ones of the axes. For example, the pose may comprise six dimensional (6D) information indicative of coordinates in three-dimensional space with respect to a designated origin, and rotation with respect to each of the three axes.

While the AMD 104 is moving, the SLAM module may provide as output a series of poses, each pose describing a location and rotations in the physical space 102. Each pose is based at least in part on the apparent motion of observed features 122 in the images. For example, from image to image at least some of the features 122 that are described by descriptors in the feature data will be in common. By determining the relative difference in apparent position in the image of the same feature 122 as observed by two different cameras at the same time, the location of a camera with respect to the feature 122 in the physical space 102 may be determined. During successive times, as the AMD 104 moves and additional images are acquired from locations in the physical space 102, the apparent change in position of the same feature 122 across the additional images may be used to determine subsequent poses. In some implementations, a pose may comprise information about six dimensions (6D), that of three orthogonal axes and corresponding rotations about those axes.

The SLAM module may also use data from other sensors 110 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module over time describe the trajectory 124. For example, trajectory data may comprise a time series of pose data from the SLAM module.

During operation of the AMD 104, various factors introduce uncertainty into the poses provided by the SLAM module. These factors may include sensor noise, changing lighting conditions that change the appearance of features 122 in images, dynamic obstacles such as people moving through the physical space 102, and so forth. This uncertainty may manifest as apparent drift of the poses with respect to the physical space 102. As the AMD 104 moves through the physical space 102, the uncertainty accumulates. For example, if the AMD 104 starts at the docking station 106, moves around the physical space 102, and returns to that docking station 106, due to drift the AMD 104 may determine that the location of the docking station 106 has changed even though the docking station 106 has remained stationary.

To address this issue, the AMD 104 may utilize a technique known as loop closure. With loop closure, the AMD 104 recognizes it has returned to a previously visited area, thus "closing a loop" that returns the AMD 104 to about the same place in the physical space 102. For loop closure to occur, the AMD 104 does not need to assume a pose identical to a previously obtained pose, but rather needs to be close enough that the features 122 associated with that pose can be obtained by the cameras and determined. To facilitate loop closure, an assumption can be made that fixed objects have not been moved since the last visit. The loop closure process provides an updated trajectory which attempts to correct for drift.

The SLAM module may designate some images and their associated feature data of descriptors of features 122 as "keyframes", and each keyframe has an associated keyframe pose that indicates the location and orientation of the AMD 104 that corresponds to the keyframe. Operation of the SLAM module is described in more detail with regard to FIG. 5.

While the AMD 104 is moving, other sensors 110 are acquiring information about the physical space 102. One or more sensors 110 may acquire depth data about the presence or absence of obstacles 108 in the physical space 102. For example, the sensors 110 may comprise a time-of-flight (TOF) depth camera, ultrasound, radar, and so forth. The depth data is indicative of whether an obstacle 108 is detected or not, and also includes information about the distance between the sensor 110 and the obstacle 108 and relative direction with respect to the sensor 110 of an obstacle 108, if detected.

The mapping module 116 may determine submaps 125 and associated submap data 126. Submap data 126 may comprise data that is representative of a portion of the physical space 102 that is indicative of the presence or absence of obstacles 108 as determined by the depth data acquired from sensors 110 such as a TOF depth camera. The mapping module 116 may determine when to designate a submap 125 based on occurrence of a trigger, such as distance travelled. Submaps 125 are discussed in more detail with regard to FIG. 5.

As mentioned above, drift accumulates, resulting in some uncertainty as to where the poses produced by the SLAM module are with respect to the physical space 102 and one another. As a result, the submap data 126 that is associated with those poses may drift as well. If uncorrected, this drift or misalignment could result in an incorrect mapping of the physical space 102. For example, drift or misalignment may result in submap data 126 that misplaces a door or a wall, designating an obstacle 108 at a location which does not correspond to the physical space 102.

During operation, the AMD 104 moves through the physical space 102, and is located at various times at visited locations 128. The mapping module 116 maintains visited location data 130 indicative of at least a portion of these visited locations 128. The visited location data 130 may specify a location with respect to one or more features 122 in the physical space 102, with respect to coordinates in the occupancy map 118, and so forth. For example, the visited location data 130 may comprise data indicative of poses along the trajectory 124. The visited locations 128 include a current location 132 of the AMD 104. For example, the current location 132 may comprise the last known visited location 128 of the AMD 104.

A navigation map module 134 uses the occupancy map 118 as input to generate a navigation map 136. The navigation map module 134 may produce the navigation map 136 to inflate or enlarge an apparent size of the obstacles 108 as represented by the occupancy map 118. One or more inflation parameters may be used during operation. The inflation parameters provide information such as inflation distance, inflation adjustment values, and so forth. In some implementations, the inflation parameters may be based at least in part on the sensor FOV 112, sensor blind spot, physical dimensions of the AMD 104, and so forth. For example, the inflation distance may be greater than or equal to one-half of a longest dimension of the AMD 104.

As mentioned earlier, the sensors 110 on the AMD 104 or in the physical space 102 acquire the sensor data 114. The sensor data 114 is processed to determine information such as a current location of the AMD 104 in the physical space 102 and to provide the information that is used to determine the occupancy map 118. The sensors 110 exhibit various limitations, including a particular sensor FOV 112, working range, may require line of sight to operate, exhibit sensor blind spots, and so forth. Except for very unusual circumstances such as very simple physical spaces 102, the sensors 110 are not able to simultaneously sense all of the areas in the physical space 102. As a result, the AMD 104 has to explore the physical space 102 by moving and directing the sensor FOV 112 of the sensors 110 so that sensor data 114 about the physical space 102 can be obtained. This sensor data 114 is then processed and the results assessed by a map assessment module 138. Valid results may be used to determine the occupancy map 118.

The map assessment module 138 assesses at least a portion of one or more maps or other representations of the physical space 102. The map assessment module 138 may determine one or more map failure locations 140. A map failure location 140 specifies a location in the physical space 102 that is associated with an inconsistency or other error associated with a representation of the physical space 102. The map assessment module 138 may include one or more of a navigability assessment module 142 or submap assessment module 144. Upon determining that a map or a portion thereof fails an assessment, a map failure location 140 is determined. The navigability assessment module 142 and submap assessment module 144 are discussed briefly in the following paragraphs. A more detailed discussion of these modules is found in the remainder of the disclosure. The map assessment module 138 may operate on previously acquired data, such as in an "offline" mode or may operate on recently acquired data, such as in an "online" mode.

The navigability assessment module 142 uses the visited location data 130 to test the occupancy map 118 and determine navigability data. An assumption may be made that any previously visited location 128 should remain accessible in the future. The navigability assessment module 142 tests at least a portion of the visited location data 130 using the occupancy map 118 or the navigation map 136 to determine if a valid navigation path to reach a previously visited location 128 exists. For example, a current location 132 and one of the previously visited locations 128 may be provided to a path planner in the autonomous navigation module 152. The path planner may provide output indicative of whether or not a valid navigation path exists that would allow the AMD 104 to travel to the previously visited location 128. In one implementation, the Theta* path planning algorithm may be used to determine a path plan. (See "Theta*: Any-Angle Path Planning on Grids", Alex Nash, Kenny Daniel, Sven Koenig, Ariel Felner.) In another implementation the A* path planning algorithm may be used. (See "A Formal Basis for the Heuristic Determination of Minimum Cost Paths", Peter E. Hart, Nils J. Nilsson, Bertram Raphael.) In other implementations other algorithms or combinations of algorithms may be used.

A determination that there is an invalid path may be indicative of the occupancy map 118 being inaccurate. The navigability assessment module 142 may test a plurality of visited locations 128 as represented by the visited location data 130. The navigability data may comprise statistics resulting from the test. For example, the visited locations 128 within a one meter portion of the trajectory 124 may be assessed. The one meter portion may include ten visited locations 128. Each of the ten visited locations 128 may be assessed to determine if a valid navigation path exists for the AMD 104 to travel from the current location 132 to individual ones of the ten visited locations 128. Continuing the example, eight of the visited locations 128 may have a valid navigation path while two do not. The resulting navigability data may indicate a percentage of previously visited locations 128 for which no valid navigation path exists. In this example, 20% of the previously visited locations are determined to be invalid. The navigability data may be compared to one or more threshold values. For example, a threshold value may specify a maximum percentage of previously visited locations 128 of 10%. In this implementation, 20% were determined. The previously visited location 128 for which no navigation path is deemed to be available may be designated as a map failure location 140.

The navigability assessment module 142 may also be used to assess a connectivity graph associated with one or more of the occupancy map 118 or the navigation map 136. For example, after a first exploration of the physical space 102 is complete, particular spaces or areas within the physical space 102 may be designated. For example, a first area may be designated as "living room", another as "kitchen", another as "hallway", and so forth. In some implementations, one or more selected locations within these designated spaces may be expressed as a graph representing navigability between these spaces. For example, a location in each space may be designated in a graph, with each node in the graph representing a room and each edge of the graph representing a valid navigation path between nodes. The graph may be tested using the navigability assessment module 142 to determine if the navigation map 136 is likely to still be accurate. For example, at a first time the AMD 104 may use the navigability assessment module 142 and determine the first navigability graph which indicates how rooms connect to allow travel. At a second time the AMD 104 may use the navigability assessment module 142 to determine a second navigability graph. A difference between the first navigability graph and the second navigability graph may be indicative of a potential error in the navigation map 136. Continuing the example, if the path from the "living room" to the "kitchen" is deemed to no longer be navigable, a map failure location 140 may be designated at a boundary between those two spaces. An exploration area 148 may be designated that includes the map failure location 140, and the area may be re-explored.

The submap assessment module 144 determines whether specified submap data 126 indicative of a submap 125 is consistent with previously acquired data as represented by the occupancy map 118. An assumption may be made that most changes in the physical space 102 are relatively minor. Incorrect data in a submap 125, misalignment, or other issues may result in the submap 125 incorrectly representing the physical space 102. The submap assessment module 144 determines a submap accuracy score that is indicative of how closely observed cells 120 in the submap data 126 correspond to the observed cells 120 in the occupancy map 118. Unknown cells are disregarded from consideration. The submap data 126 that is being assessed is not used to determine the occupancy map 118. If the submap accuracy score is greater than a threshold value, the submap data 126 may be deemed accurate and used to update the occupancy map 118. If the submap accuracy score is less than the threshold value, the submap data 126 may be deemed inaccurate and may be discarded. A map failure location 140 may be associated with an area associated with the submap data 126. For example, the map failure location 140 may comprise a location associated with an anchor of the submap 125. The map failure location 140, or at least a portion of the area in the physical space 102 that is associated with the submap data 126 may be designated as an exploration area 148.

Once a failed assessment is determined, an exploration module 146 may determine an exploration area 148. For example, the exploration area 148 may comprise an area in the physical space 102 that includes the map failure location 140. In one implementation the exploration area 148 may be centered on the map failure location 140. In other implementations the map failure location 140 may specify an edge or other point with respect to the exploration area 148.

The exploration module 146 may determine exploration data 150 that specifies the exploration area 148. The exploration module 146 may then operate in conjunction with an autonomous navigation module 152 to attempt to explore the exploration area 148. For example, the exploration module 146 may send instructions to the autonomous navigation module 152 to move to a location near or within the exploration area 148. During exploration, additional sensor data 114 may be acquired. For example, submap data 126 may be determined that describes at least a portion of the exploration area 148.

The exploration module 146 may direct the AMD 104 to explore the physical space 102 in order to gather sensor data 114 and subsequently create or update the occupancy map 118. For example, the submap data 126 may be assessed as described above, and if valid, the submap data 126 may be incorporated into the occupancy map 118. Exploration may take place in different situations. For example, when the AMD 104 is first introduced into the physical space 102, exploration is necessary to generate the occupancy map 118 for the first time. Later, as sensor data 114 is obtained while the AMD 104 moves about, or during subsequent explorations, the map assessment module 138 may be used to test at least a portion of the existing occupancy map 118, determine whether submap data 126 is valid for incorporating into the occupancy map 118, and so on.

The autonomous navigation module 152 provides the AMD 104 with the ability to navigate within the physical space 102 without real-time human interaction. A command to move may be the result of an input from the user, a previously scheduled task, responsive to input from one or more sensors 110, a command from an external computing device, or another source. For example, the exploration module 146 may direct the AMD 104 to move to near or within the exploration area 148. The autonomous navigation module 152 may implement, or operate in conjunction with, the mapping module 116 to determine one or more of the occupancy map 118, submaps 125, the navigation map 136, or other representations of the physical space 102.

The autonomous navigation module 152 may generate path plan data that is indicative of a path through the physical space 102 from a first location to a second location. The AMD 104 may then begin moving along the path. While moving along the path, the AMD 104 may assess the physical space 102 and update or change the path as appropriate. For example, if an obstacle 108 appears in the path, the mapping module 116 may determine an alternative path to the destination location.

Data obtained by one AMD 104(1) may be shared with another AMD 104(2). For example, the occupancy map 118 or navigation map 136 determined by a first AMD 104(1) may be sent via network connection to a second AMD 104(2). Information associated with changes to the maps, results from the map assessment module 138, and so forth may also be shared. For example, in the event a map failure location 140 is determined by the first AMD 104(1), a notification may be sent to the second AMD 104(2) advising of the map failure location 140. Such information sharing helps a plurality of AMDs 104 to improve their overall understanding of the physical space 102 and improves overall performance of the system.

Distances in this disclosure may be described with regard to a distance in the physical space 102, with regard to a representation such as an occupancy map 118 or navigation map 136, and so forth. For example, a distance between a first cell 120(1) and a second cell 120(2) may be calculated as a distance in the physical space 102 as measured from a first center of a first area in the physical space 102 associated with the first cell 120(1) and a second center of a second area in the physical space 102 associated with the second cell 120(2), such as "0.35 meters". In another example, the same distance between the first cell 120(1) representing the same first area as above and the second cell 120(2) representing the same second area as above may be expressed in units of cells 120, such as "7 cells". In situations where the cells 120 are associated with a fixed dimension with respect to the physical space 102, distances may be converted between the physical space 102 and the representations by the cells 120 using a conversion factor. For example, if each cell 120 describes a 5 cm square area within the physical space 102, a horizontal or vertical distance of "one cell" equals 5 cm.

Distances may be calculated between points, centers, vertices, and so forth. For example, a distance may be calculated between edges of the cells 120 or the areas in the physical space 102 associated with those cells 120. In some implementations, with regard to representations such as the occupancy map 118 or the navigation map 136, distances may be determined as straight line distances from one cell 120 to another, or as rectilinear distance, also known as a "taxicab distance".

Modules described herein, such as the mapping module 116, may provide various processing functions such as de-noising, filtering, and so forth. Processing of sensor data 114, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 114. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 114 or other data. For example, the ANN may be trained using a supervised learning algorithm such that object identifiers are associated with images of particular objects within training images provided to the ANN. Once trained, the ANN may be provided with the sensor data 114 and produce output indicative of the object identifier.

Figure 3:
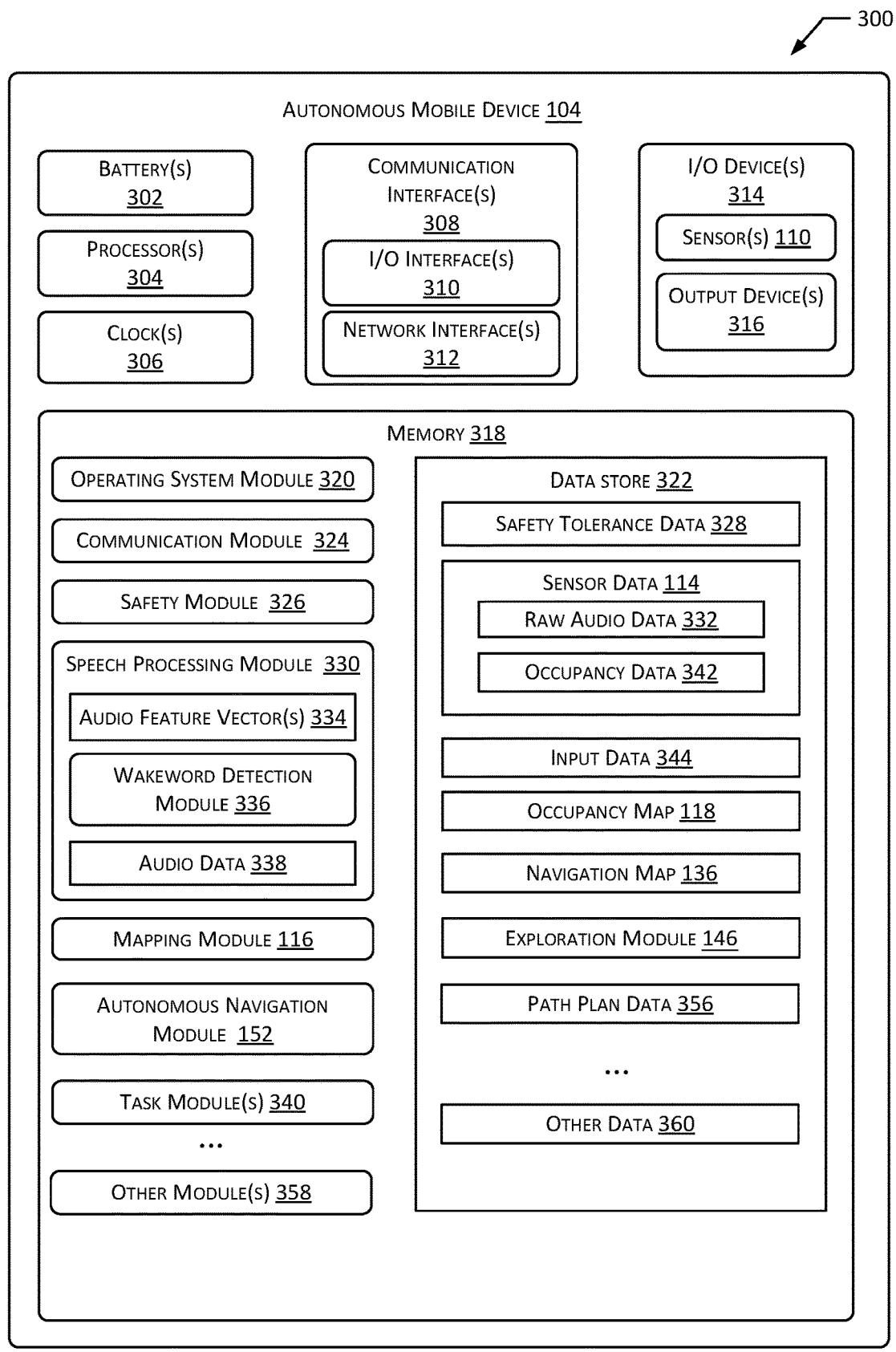
FIG. 3 is a block diagram of the components of the AMD, according to some implementations.
Figure 4:
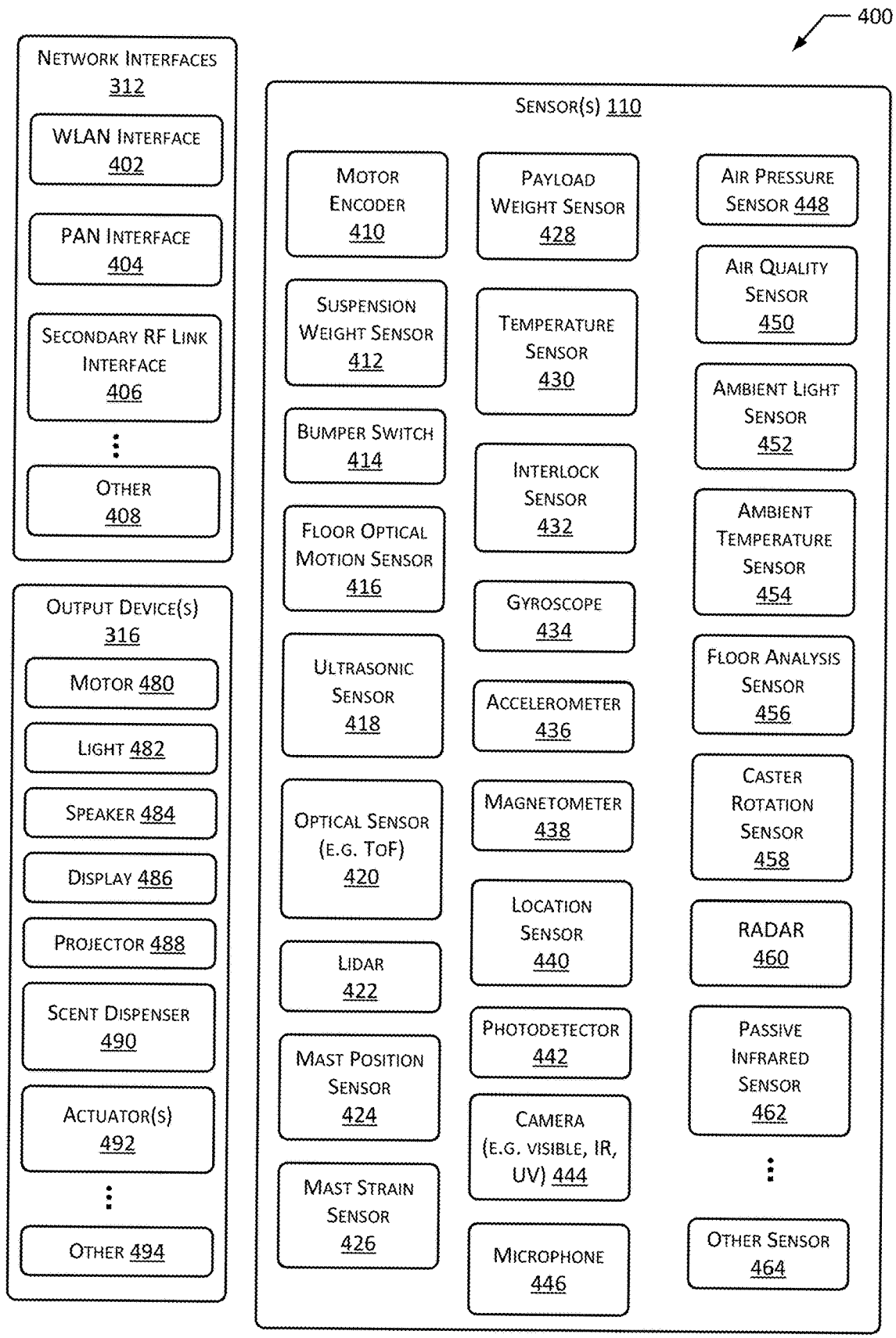
FIG. 4 is a block diagram of some components of the AMD, such as network interfaces, sensors, and output devices, according to some implementations.

Components of the AMD 104 are described in more detail with regard to FIGS. 3 and 4.

By using the techniques and systems described in this disclosure, an accurate occupancy map 118 may be determined and maintained. The AMD 104 or another computing device, is able to quickly and efficiently assess an occupancy map 118 or portion thereof such as submap data 126. Areas in the physical space 102 that exhibit inconsistencies may be targeted for exploration. As a result, once an initial occupancy map 118 has been generated, it may be maintained and updated much more efficiently. Time spent, power consumption, and consumption of computational resources are all significantly reduced compared to traditional techniques. Additionally, lengthy or unnecessary re-exploration of the physical space is reduced, improving the user experience by increasing the availability of the AMD 104 to perform tasks for the user.

Figure 2:
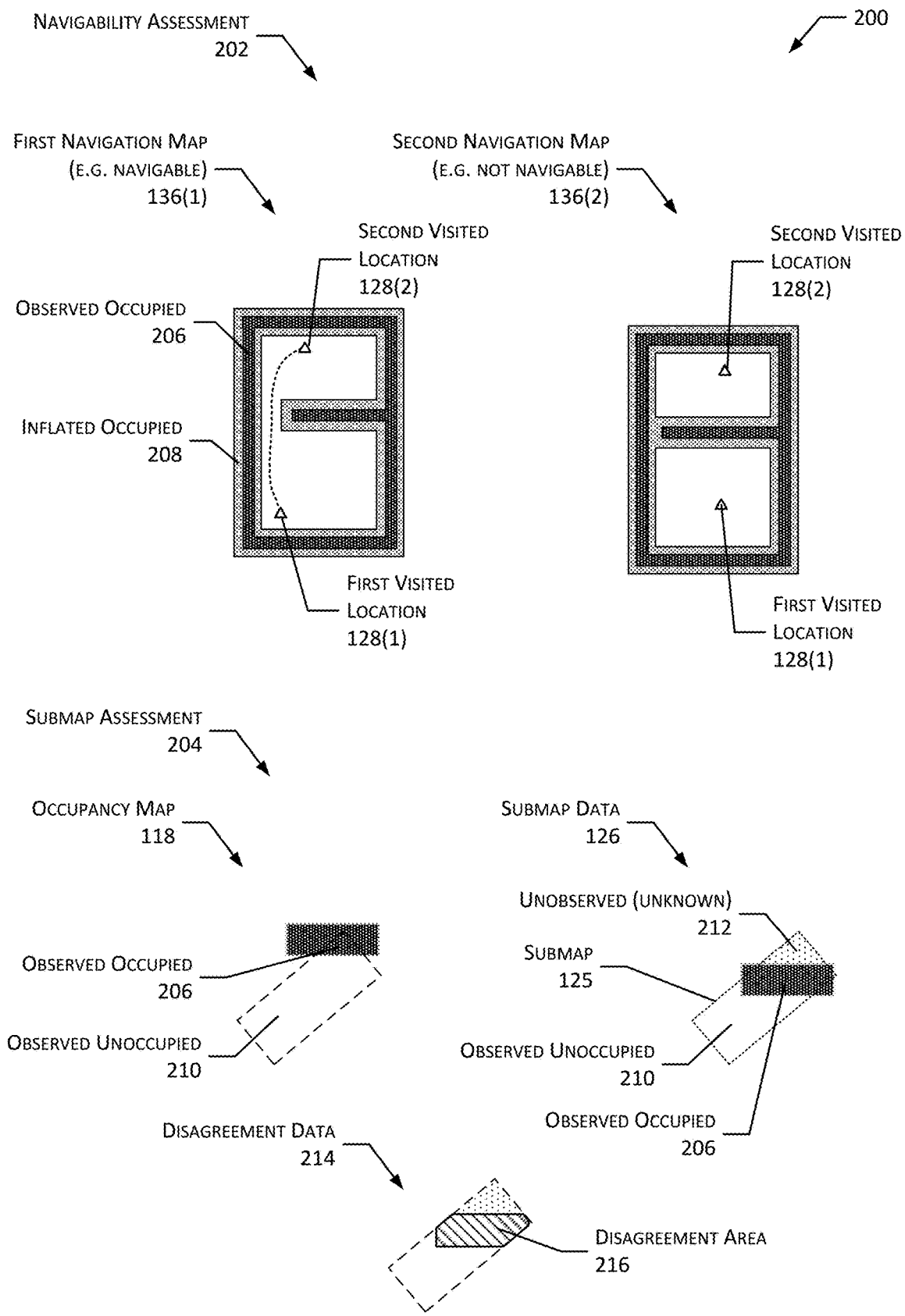
FIG. 2 illustrates a navigability assessment and submap assessment, according to some implementations.

FIG. 2 illustrates at 200 a navigability assessment and submap assessment, according to some implementations. These assessments may be performed at least in part by the map assessment module 138. A navigability assessment 202 and a submap assessment 204 are shown.

The navigability assessment 202 may be performed at least in part by the navigability assessment module 142. The navigability assessment 202 determines if the map being assessed provides a valid navigation path from a specified location to a previously visited location 128. For example, the navigability assessment module 142 may use a navigation map 136 that is based on a first version of the occupancy map 118.

The navigation map 136 may designate areas, such as cells 120, as being observed occupied 206, inflated occupied 208, or observed unoccupied 210. An observed occupied 206 cell 120 has been determined to contain an obstacle 108. The navigation map module 134 may generate the navigation map 136 by inflating, or enlarging, the apparent size of obstacles 108. These areas that have been designated as containing an obstacle 108 resulting from the inflation process of the navigation map module 134 may be designated as inflated occupied 208. In other implementations, these areas may be given the same occupancy data as other obstacles 108. For example, the inflated occupied 208 cell may be designated with the same occupancy data type as an observed occupied 206 cell. An observed unoccupied 210 cell is an area that has been designated as containing no obstacle 108 that would impede traversal of the AMD 104.

A first navigation map 136(1) is shown. A first visited location 128(1) is shown, as is a second visited location 128(2). For example, the first visited location 128(1) may comprise the current location 132, a location of the docking station 106, or some other previously visited location 128 as stored in the visited location data 130. The second visited location 128(2) may be selected as being at least a minimum distance from the first visited location 128(1), has not been visited for some threshold time, and so forth. A path is shown between the first visited location 128(1) and the second visited location 128(2). For example, the path may be determined by a path planner of the autonomous navigation module 152. The first navigation map 136(1) may be deemed valid because at least one path between the two locations has been determined, passing between the two obstacles.

In comparison, a second navigation map 136(2) is deemed invalid because no navigation path from the first visited location 128(1) to the second visited location 128(2) exists between the obstacles 108. For example, the path planner may fail to determine a path due to the obstruction of the inflated occupied 208 or observed occupied 206 cells 120 in the second navigation map 136(2).

In some implementations, information about the location of the obstruction may be used to determine a map failure location 140. For example, if a previous version of the navigation map 136 was assessed to have a first navigation path that permitted navigation to the second visited location 128(2), the first navigation path may be compared to the second navigation map 136(2) that is being assessed. The points along the first navigation path that intersect obstacles as indicated by the second navigation map 136(2) may be designated as map failure locations 140. An exploration area 148 may be designated with respect to the map failure locations 140. For example, the exploration area 148 may comprise an area that corresponds to the cells 120 along the first navigation path that are designated as containing obstacles 108 in the second navigation map 136(2).

The submap assessment 204 may be performed at least in part by the submap assessment module 144. A portion of the occupancy map 118 is depicted and corresponding submap data 126 of a submap 125. Also shown is an unobserved or unknown 212 portion. For example, while acquiring the sensor data 114 used to determine the submap data 126, an obstacle 108 may block the view of the sensor 110, preventing data from being acquired about that area within the physical space 102.

The submap assessment module 144 may compare information about observed occupied 206 and observed unoccupied 210 cells in the occupancy map 118 with the submap data 126. Unobserved or unknown 212 cells may be disregarded. A submap accuracy score may be determined based on this comparison. For example, a submap accuracy score of 100 may indicate that no difference is present between the observed cells 120 of the occupancy map 118 and the submap data 126. The submap accuracy score is discussed in more detail with regard to FIG. 7.

In some implementations, disagreement data 214 may be determined that is indicative of a difference in the observed cells 120 of the occupancy map 118 and the submap data 126 being assessed. For example, as shown in this illustration, the unobserved 212 portion of the submap 125 is disregarded, and a disagreement area 216 is shown. In some implementations, the exploration module 146 may use information, such as the disagreement data 214 to determine where to explore. For example, exploration data 150 may be determined that directs the AMD 104 to approach the disagreement area 216 and acquire sensor data 114.

FIG. 3 is a block diagram 300 of the AMD 104, according to some implementations. The AMD 104 may include one or more batteries 302 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 304 (processors) configured to execute one or more stored instructions. The processors 304 may comprise one or more cores. The processors 304 may include microcontrollers, systems on a chip, field programmable gate arrays, digital signal processors, graphic processing units, general processing units, and so forth.

One or more clocks 306 may provide information indicative of date, time, ticks, and so forth. For example, a processor 304 may use data from the clock 306 to associate a particular time with an action, sensor data 114, and so forth.

The AMD 104 may include one or more communication interfaces 308 such as input/output (I/O) interfaces 310, network interfaces 312, and so forth. The communication interfaces 308 enable the AMD 104, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 110, keyboard, mouse, scanner, and so forth. The I/O devices 314 may also include output devices 316 such as one or more of a motor, light, speaker, display, projector, printer, and so forth. In some embodiments, the I/O devices 314 may be physically incorporated with the AMD 104 or may be externally placed.

The network interfaces 312 may be configured to provide communications between the AMD 104 and other devices such as other AMDs 104, docking stations 106, routers, access points, and so forth. The network interfaces 312 may include devices configured to couple to personal area networks (PANs), local area networks (LANs), wireless local area networks (WLANS), wide area networks (WANs), and so forth. For example, the network interfaces 312 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 3, the AMD 104 includes one or more memories 318. The memory 318 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 318 provides storage of computer-readable instructions, data structures, program modules, and other data for the operation of the AMD 104. A few example functional modules are shown stored in the memory 318, although the same functionality may alternatively be implemented in hardware, firmware, or as a system on a chip (SoC).

The memory 318 may include at least one operating system (OS) module 320. The OS module 320 is configured to manage hardware resource devices such as the I/O interfaces 310, the I/O devices 314, the communication interfaces 308, and provide various services to applications or modules executing on the processors 304. The OS module 320 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS), and so forth.

Also stored in the memory 318 may be a data store 322 and one or more of the following modules. These modules may be executed as foreground applications, background tasks, daemons, and so forth. The data store 322 may use a flat file, database, linked list, tree, executable code, script, or other data structure to store information. In some implementations, the data store 322 or a portion of the data store 322 may be distributed across one or more other devices including other AMDs 104, servers, network attached storage devices, and so forth.

A communication module 324 may be configured to establish communication with other devices, such as other AMDs 104, an external server, a docking station 106, and so forth. The communications may be authenticated, encrypted, and so forth.

Other modules within the memory 318 may include a safety module 326, a speech processing module 330, the mapping module 116, a navigation map module 134, the autonomous navigation module 152, the exploration module 146, one or more task modules 340, or other modules 358. The modules may access data stored within the data store 322, including safety tolerance data 328, sensor data 114 including raw audio data 332 and occupancy data 342, input data 344, one or more occupancy maps 118, one or more navigation maps 136, frontier cell data 346, observation target cell data 348, goal pose data 350, exclusion list data 352, exploration thresholds 354, path plan data 356, other data 360, and so forth.

The occupancy data 342 may comprise data indicative of the contents of one or more cells 120 in the occupancy map 118. For example, the occupancy data 342 may indicate that a particular cell 120 is occupied, unoccupied, or unobserved.

The safety module 326 may access the safety tolerance data 328 to determine within what tolerances the AMD 104 may operate safely within the physical space 102. For example, the safety module 326 may be configured to stop the AMD 104 from moving when an extensible mast of the AMD 104 is extended. In another example, the safety tolerance data 328 may specify a minimum sound threshold which, when exceeded, stops all movement of the AMD 104. Continuing this example, detection of sound such as a human yell would stop the AMD 104. In another example, the safety module 326 may access safety tolerance data 328 that specifies a minimum distance from an object that the AMD 104 is to maintain. Continuing this example, when a sensor 110 detects an object has approached to less than the minimum distance, all movement of the AMD 104 may be stopped.

One or more motors or other actuators enable the AMD 104 to move from one location in the physical space 102 to another. For example, a motor may be used to drive a wheel attached to a chassis of the AMD 104, which causes the AMD 104 to move. The AMD 104 may turn, move forward, move backward, and so forth. Movement of the AMD 104 may be stopped by one or more of inhibiting operations of one or more motors, issuing a command to stop motor operation, disconnecting power from one or more the motors, and so forth. The safety module 326 may be implemented as hardware, software, or a combination thereof.

The safety module 326 may control other factors, such as a maximum speed of the AMD 104 based on information obtained by the sensors 110, precision and accuracy of the sensor data 114, and so forth. For example, detection of an object by an optical sensor may include some error, such as when the distance to an object comprises a weighted average between the object and a background. As a result, the maximum speed permitted by the safety module 326 may be based on one or more factors such as the weight of the AMD 104, nature of the floor, distance to the object, and so forth. In the event that the maximum permissible speed differs from the maximum speed permitted by the safety module 326, the lesser speed may be utilized.

The speech processing module 330 may be used to process utterances of the user. Microphones may acquire audio in the presence of the AMD 104 and may send raw audio data 332 to an acoustic front end (AFE). The AFE may transform the raw audio data 332 (for example, a single-channel, 16-bit audio stream sampled at 16 kHz), captured by the microphone, into audio feature vectors 334 that may ultimately be used for processing by various components, such as a wakeword detection module 336, speech recognition engine, or other components. The AFE may reduce noise in the raw audio data 332. The AFE may also perform acoustic echo cancellation (AEC) or other operations to account for output audio data that may be sent to a speaker of the AMD 104 for output. For example, the AMD 104 may be playing music or other audio that is being received from a network in the form of output audio data. To avoid the output audio interfering with the device's ability to detect and process input audio, the AFE or other component may perform echo cancellation to remove the output audio data from the input raw audio data 332, or other operations.

The AFE may divide the raw audio data 332 into frames representing time intervals for which the AFE determines a number of values (i.e., features) representing qualities of the raw audio data 332, along with a set of those values (i.e., a feature vector or audio feature vector 334) representing features/qualities of the raw audio data 332 within each frame. A frame may be a certain period of time, for example a sliding window of 25 ms of audio data 338 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 332, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 334 (or the raw audio data 332) may be input into a wakeword detection module 336 that is configured to detect keywords spoken in the audio. The wakeword detection module 336 may use various techniques to determine whether audio data 338 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 336 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 336 may compare audio data 338 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 338 (which may include one or more of the raw audio data 332 or the audio feature vectors 334) to one or more server(s) for speech processing. The audio data 338 corresponding to audio obtained by the microphone may be processed locally on one or more of the processors 304, sent to a server for routing to a recipient device, or may be sent to the server for speech processing for interpretation of the included speech (either for purposes of enabling voice-communications and/or for purposes of executing a command in the speech). The audio data 338 may include data corresponding to the wakeword, or the portion of the audio data 338 corresponding to the wakeword may be removed by the AMD 104 before processing by the navigation map module 134, prior to sending to the server, and so forth.

The speech processing module 330 may include or access an automated speech recognition (ASR) module. The ASR module may accept as input raw audio data 332, audio feature vectors 334, or other sensor data 114 and so forth and may produce as output the input data 344 comprising a text string or other data representation. The input data 344 comprising the text string or other data representation may be processed by the navigation map module 134 to determine the command to be executed. For example, the utterance of the command "robot, come here" may result in input data 344 comprising the text string "come here". The wakeword "robot" may be omitted from the input data 344.

As described above, the autonomous navigation module 152 provides the AMD 104 with the ability to navigate within the physical space 102 without real-time human interaction. The autonomous navigation module 152 may implement, or operate in conjunction with, the mapping module 116 to determine the occupancy map 118, the navigation map 136, or other representation of the physical space 102. In one implementation, the mapping module 116 may use one or more simultaneous localization and mapping ("SLAM") techniques. The SLAM algorithms may utilize one or more of maps, algorithms, beacons, or other techniques to navigate. The autonomous navigation module 152 may use the navigation map 136 to determine a set of possible paths along which the AMD 104 may move. One of these may be selected and used to determine path plan data 356 indicative of a path. For example, a possible path that is the shortest or has the fewest turns may be selected and used to determine the path. The path is then subsequently used to determine a set of commands that drive the motors connected to the wheels. For example, the autonomous navigation module 152 may determine the current location 132 within the physical space 102 and determine path plan data 356 that describes the path to a destination location such as the docking station 106.

The autonomous navigation module 152 may utilize various techniques during processing of sensor data 114. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 304, in response to a command received from one or more communication interfaces 308, as determined from the sensor data 114, and so forth. For example, an external server may send a command that is received using the network interface 312. This command may direct the AMD 104 to proceed to find a particular user, follow a particular user, and so forth. The AMD 104 may then process this command and use the autonomous navigation module 152 to determine the directions and distances associated with carrying out the command. For example, the command to "come here" may result in the task module 340 sending a command to the autonomous navigation module 152 to move the AMD 104 to a particular location near the user and orient the AMD 104 in a particular direction.

The AMD 104 may utilize one or more task modules 340. The task module 340 comprises instructions that, when executed, provide one or more functions. The task modules 340 may perform functions such as finding a user, following a user, present output on output devices 316 of the AMD 104, perform sentry tasks by moving the AMD 104 through the physical space 102 to determine the presence of unauthorized people, and so forth.

The AMD 104 may connect to the network using one or more of the network interfaces 312. In some implementations, one or more of the modules or other functions described here may execute on the processors 304 of the AMD 104, on the server, or a combination thereof. For example, one or more servers may provide various functions, such as ASR, natural language understanding (NLU), providing content such as audio or video to the AMD 104, and so forth.

The other modules 358 may provide other functionality, such as object recognition, speech synthesis, user identification, and so forth. The other modules 358 may comprise a speech synthesis module that is able to convert text data to human speech. For example, the speech synthesis module may be used by the AMD 104 to provide speech that a user is able to understand.

The data store 322 may store the other data 360 as well. For example, localization settings may indicate local preferences such as language, user identifier data may be stored that allows for identification of a particular user, and so forth.

FIG. 4 is a block diagram 400 of some components of the AMD 104 such as network interfaces 312, sensors 110, and output devices 316, according to some implementations. The components illustrated here are provided by way of illustration and not necessarily as a limitation. For example, the AMD 104 may utilize a subset of the particular network interfaces 312, output devices 316, or sensors 110 depicted here, or may utilize components not pictured. One or more of the sensors 110, output devices 316, or a combination thereof may be included on a moveable component that may be panned, tilted, rotated, or any combination thereof with respect to a chassis of the AMD 104.

The network interfaces 312 may include one or more of a WLAN interface 402, PAN interface 404, secondary radio frequency (RF) link interface 406, or other interface 408. The WLAN interface 402 may be compliant with at least a portion of the Wi-Fi specification. For example, the WLAN interface 402 may be compliant with at least a portion of the IEEE 802.11 specification as promulgated by the Institute of Electrical and Electronics Engineers (IEEE). The PAN interface 404 may be compliant with at least a portion of one or more of the Bluetooth, wireless USB, Z-Wave, ZigBee, or other standards. For example, the PAN interface 404 may be compliant with the Bluetooth Low Energy (BLE) specification.

The secondary RF link interface 406 may comprise a radio transmitter and receiver that operate at frequencies different from or using modulation different from the other interfaces. For example, the WLAN interface 402 may utilize frequencies in the 2.4 GHz and 5 GHz Industrial Scientific and Medicine (ISM) bands, while the PAN interface 404 may utilize the 2.4 GHz ISM bands. The secondary RF link interface 406 may comprise a radio transmitter that operates in the 900 MHz ISM band, within a licensed band at another frequency, and so forth. The secondary RF link interface 406 may be utilized to provide backup communication between the AMD 104 and other devices in the event that communication fails using one or more of the WLAN interface 402 or the PAN interface 404. For example, in the event the AMD 104 travels to an area within the physical space 102 that does not have Wi-Fi coverage, the AMD 104 may use the secondary RF link interface 406 to communicate with another device such as a specialized access point, docking station 106, or other AMD 104.

The other 408 network interfaces may include other equipment to send or receive data using other wavelengths or phenomena. For example, the other 408 network interface may include an ultrasonic transceiver used to send data as ultrasonic sounds, a visible light system that communicates by modulating a visible light source such as a light-emitting diode, and so forth. In another example, the other 408 network interface may comprise a wireless wide area network (WWAN) interface or a wireless cellular data network interface. Continuing the example, the other 408 network interface may be compliant with at least a portion of the 3G, 4G, 5G, LTE, or other standards.

The AMD 104 may include one or more of the following sensors 110. The sensors 110 depicted here are provided by way of illustration and not necessarily as a limitation. It is understood that other sensors 110 may be included or utilized by the AMD 104, while some sensors 110 may be omitted in some configurations.

A motor encoder 410 provides information indicative of the rotation or linear extension of a motor 480. The motor 480 may comprise a rotary motor, or a linear actuator. In some implementations, the motor encoder 410 may comprise a separate assembly such as a photodiode and encoder wheel that is affixed to the motor 480. In other implementations, the motor encoder 410 may comprise circuitry configured to drive the motor 480. For example, the autonomous navigation module 152 may utilize the data from the motor encoder 410 to estimate a distance traveled.

A suspension weight sensor 412 provides information indicative of the weight of the AMD 104 on the suspension system for one or more of the wheels or the caster. For example, the suspension weight sensor 412 may comprise a switch, strain gauge, load cell, photodetector, or other sensing element that is used to determine whether weight is applied to a particular wheel, or whether weight has been removed from the wheel. In some implementations, the suspension weight sensor 412 may provide binary data such as a "1" value indicating that there is a weight applied to the wheel, while a "0" value indicates that there is no weight applied to the wheel. In other implementations, the suspension weight sensor 412 may provide an indication such as so many kilograms of force or newtons of force. The suspension weight sensor 412 may be affixed to one or more of the wheels or the caster. In some situations, the safety module 326 may use data from the suspension weight sensor 412 to determine whether or not to inhibit operation of one or more of the motors 480. For example, if the suspension weight sensor 412 indicates no weight on the suspension, the implication is that the AMD 104 is no longer resting on its wheels, and thus operation of the motors 480 may be inhibited. In another example, if the suspension weight sensor 412 indicates weight that exceeds a threshold value, the implication is that something heavy is resting on the AMD 104 and thus operation of the motors 480 may be inhibited.

One or more bumper switches 414 provide an indication of physical contact between a bumper or other member that is in mechanical contact with the bumper switch 414. The safety module 326 utilizes sensor data 114 obtained by the bumper switches 414 to modify the operation of the AMD 104. For example, if the bumper switch 414 associated with a front of the AMD 104 is triggered, the safety module 326 may drive the AMD 104 backwards.

A floor optical motion sensor (FOMS) 416 provides information indicative of motion of the AMD 104 relative to the floor or other surface underneath the AMD 104. In one implementation, the FOMS 416 may comprise a light source such as a light-emitting diode (LED), an array of photodiodes, and so forth. In some implementations, the FOMS 416 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 416 may provide other information, such as data indicative of a pattern present on the floor, composition of the floor, color of the floor, and so forth. For example, the FOMS 416 may utilize an optoelectronic sensor that may detect different colors or shades of gray, and this data may be used to generate floor characterization data. The floor characterization data may be used for navigation.

An ultrasonic sensor 418 utilizes sounds in excess of 20 kHz to determine a distance from the sensor 110 to an object. The ultrasonic sensor 418 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 418 may provide information indicative of a presence of an object, distance to the object, and so forth. Two or more ultrasonic sensors 418 may be utilized in conjunction with one another to determine a location within a two-dimensional plane of the object.

In some implementations, the ultrasonic sensor 418 or a portion thereof may be used to provide other functionality. For example, the emitter of the ultrasonic sensor 418 may be used to transmit data and the detector may be used to receive data transmitted that is ultrasonic sound. In another example, the emitter of an ultrasonic sensor 418 may be set to a particular frequency and used to generate a particular waveform such as a sawtooth pattern to provide a signal that is audible to an animal, such as a dog or a cat.

An optical sensor 420 may provide sensor data 114 indicative of one or more of a presence or absence of an object, a distance to the object, or characteristics of the object. The optical sensor 420 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 420 may utilize one or more sensing elements. For example, the optical sensor 420 may comprise a 4×4 array of light sensing elements. Each individual sensing element may be associated with a field of view (FOV) that is directed in a different way. For example, the optical sensor 420 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 110 such as an image sensor or camera 444. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 420 may operate as a depth camera, providing a two-dimensional image of a scene, as well as data that indicates a distance to each pixel.

Data from the optical sensors 420 may be utilized for collision avoidance. For example, the safety module 326 and the autonomous navigation module 152 may utilize the sensor data 114 indicative of the distance to an object in order to prevent a collision with that object.

Multiple optical sensors 420 may be operated such that their FOV overlap at least partially. To minimize or eliminate interference, the optical sensors 420 may selectively control one or more of the timing, modulation, or frequency of the light emitted. For example, a first optical sensor 420 may emit light modulated at 30 kHz while a second optical sensor 420 emits light modulated at 33 kHz.

A lidar 422 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 114 may be generated that is indicative of the presence of objects and the relative positions, shapes, and so forth that are visible to the lidar 422. Data from the lidar 422 may be used by various modules. For example, the autonomous navigation module 152 may utilize point cloud data generated by the lidar 422 for localization of the AMD 104 within the physical space 102.

The AMD 104 may include a mast. A mast position sensor 424 provides information indicative of a position of the mast of the AMD 104. For example, the mast position sensor 424 may comprise limit switches associated with the mast extension mechanism that indicate whether the mast is at an extended or retracted position. In other implementations, the mast position sensor 424 may comprise an optical code on at least a portion of the mast that is then interrogated by an optical emitter and a photodetector to determine the distance to which the mast is extended. In another implementation, the mast position sensor 424 may comprise an encoder wheel that is attached to a mast motor that is used to raise or lower the mast. The mast position sensor 424 may provide data to the safety module 326. For example, if the AMD 104 is preparing to move, data from the mast position sensor 424 may be checked to determine if the mast is retracted, and if not, the mast may be retracted prior to beginning movement.

A mast strain sensor 426 provides information indicative of a strain on the mast with respect to the remainder of the AMD 104. For example, the mast strain sensor 426 may comprise a strain gauge or load cell that measures a side-load applied to the mast or a weight on the mast or downward pressure on the mast. The safety module 326 may utilize sensor data 114 obtained by the mast strain sensor 426. For example, if the strain applied to the mast exceeds a threshold amount, the safety module 326 may direct an audible and visible alarm to be presented by the AMD 104.

The AMD 104 may include a modular payload bay. A payload weight sensor 428 provides information indicative of the weight associated with the modular payload bay. The payload weight sensor 428 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 428 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 428 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 326 may utilize the payload weight sensor 428 to determine if the modular payload bay has been overloaded. If so, an alert or notification may be issued.

One or more device temperature sensors 430 may be utilized by the AMD 104. The device temperature sensors 430 provide temperature data of one or more components within the AMD 104. For example, a device temperature sensor 430 may indicate a temperature of one or more the batteries 302, one or more motors 480, and so forth. In the event the temperature exceeds a threshold value, the component associated with that device temperature sensor 430 may be shut down.

One or more interlock sensors 432 may provide data to the safety module 326 or other circuitry that prevents the AMD 104 from operating in an unsafe condition. For example, the interlock sensors 432 may comprise switches that indicate whether an access panel is open. The interlock sensors 432 may be configured to inhibit operation of the AMD 104 until the interlock switch indicates a safe condition is present.

A gyroscope 434 may provide information indicative of rotation of an object affixed thereto. For example, a gyroscope 434 may generate sensor data 114 that is indicative of a change in orientation of the AMD 104 or a portion thereof.

An accelerometer 436 provides information indicative of a direction and magnitude of an imposed acceleration. Data such as rate of change, determination of changes in direction, speed, and so forth may be determined using the accelerometer 436. The accelerometer 436 may comprise mechanical, optical, micro-electromechanical, or other devices. For example, the gyroscope 434 in the accelerometer 436 may comprise a prepackaged solid-state inertial measurement unit (IMU) that provides multiple axis gyroscopes 434 and accelerometers 436.

A magnetometer 438 may be used to determine an orientation by measuring ambient magnetic fields, such as the terrestrial magnetic field. For example, the magnetometer 438 may comprise a Hall effect transistor that provides output compass data indicative of a magnetic heading.

The AMD 104 may include one or more location sensors 440. The location sensors 440 may comprise an optical, radio, or other navigational system such as a global positioning system (GPS) receiver. For indoor operation, the location sensors 440 may comprise indoor position systems, such as using Wi-Fi Positioning Systems (WPS). The location sensors 440 may provide information indicative of a relative location, such as "living room" or an absolute location such as particular coordinates indicative of latitude and longitude, or displacement with respect to a predefined origin.

A photodetector 442 provides sensor data 114 indicative of impinging light. For example, the photodetector 442 may provide data indicative of a color, intensity, duration, and so forth.

A camera 444 generates sensor data 114 indicative of one or more images. The camera 444 may be configured to detect light in one or more wavelengths including, but not limited to, terahertz, infrared, visible, ultraviolet, and so forth. For example, an infrared camera 444 may be sensitive to wavelengths between approximately 700 nanometers and 1 millimeter. The camera 444 may comprise charge coupled devices (CCD), complementary metal oxide semiconductor (CMOS) devices, microbolometers, and so forth. The AMD 104 may use image data acquired by the camera 444 for object recognition, navigation, collision avoidance, user communication, and so forth. For example, a pair of cameras 444 sensitive to infrared light may be mounted on the front of the AMD 104 to provide binocular stereo vision, with the sensor data 114 comprising images being sent to the autonomous navigation module 152. In another example, the camera 444 may comprise a 10 megapixel or greater camera that is used for videoconferencing or for acquiring pictures for the user.

The camera 444 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 152 may be acquired using a rolling shutter and subsequently may be processed to mitigate image artifacts.

One or more microphones 446 may be configured to acquire information indicative of sound present in the physical space 102. In some implementations, arrays of microphones 446 may be used. These arrays may implement beamforming techniques to provide for directionality of gain. The AMD 104 may use the one or more microphones 446 to acquire information from acoustic tags, accept voice input from users, determine a direction of an utterance, determine ambient noise levels, for voice communication with another user or system, and so forth.

An air pressure sensor 448 may provide information indicative of an ambient atmospheric pressure or changes in ambient atmospheric pressure. For example, the air pressure sensor 448 may provide information indicative of changes in air pressure due to opening and closing of doors, weather events, and so forth.

An air quality sensor 450 may provide information indicative of one or more attributes of the ambient atmosphere. For example, the air quality sensor 450 may include one or more chemical sensing elements to detect the presence of carbon monoxide, carbon dioxide, ozone, and so forth. In another example, the air quality sensor 450 may comprise one or more elements to detect particulate matter in the air, such as the photoelectric detector, ionization chamber, and so forth. In another example, the air quality sensor 450 may include a hygrometer that provides information indicative of relative humidity.

An ambient light sensor 452 may comprise one or more photodetectors 442 or other light-sensitive elements that are used to determine one or more of the color, intensity, or duration of ambient lighting around the AMD 104.

An ambient temperature sensor 454 provides information indicative of the temperature of the ambient physical space 102 proximate to the AMD 104. In some implementations, an infrared temperature sensor may be utilized to determine the temperature of another object at a distance.

A floor analysis sensor 456 may include one or more components that are used to generate at least a portion of floor characterization data. In one implementation, the floor analysis sensor 456 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 456 may be used by one or more of the safety module 326, the autonomous navigation module 152, the task module 340, and so forth. For example, if the floor analysis sensor 456 determines that the floor is wet, the safety module 326 may decrease the speed of the AMD 104 and generate a notification alerting the user.

The floor analysis sensor 456 may include other components as well. For example, a coefficient of friction sensor may comprise a probe that comes into contact with the surface and determines the coefficient of friction between the probe and the floor.

A caster rotation sensor 458 provides data indicative of one or more of a direction of orientation, angular velocity, linear speed of the caster, and so forth. For example, the caster rotation sensor 458 may comprise an optical encoder and corresponding target that is able to determine that the caster transitioned from an angle of 0° at a first time to 49° at a second time.

The sensors 110 may include a radar 460. The radar 460 may be used to provide information as to a distance, lateral position, and so forth, to an object.

The sensors 110 may include a passive infrared (PIR) sensor 462. The PIR sensor 462 may be used to detect the presence of users, pets, hotspots, and so forth. For example, the PIR sensor 462 may be configured to detect infrared radiation with wavelengths between 8 and 14 micrometers.

The AMD 104 may include other sensors 464 as well. For example, a capacitive proximity sensor may be used to provide proximity data to adjacent objects. Other sensors 464 may include radio frequency identification (RFID) readers, near field communication (NFC) systems, coded aperture cameras, and so forth. For example, NFC tags may be placed at various points within the physical space 102 to provide landmarks for the autonomous navigation module 152. One or more touch sensors may be utilized to determine contact with a user or other objects.

Sensors such as the optical sensor 420, lidar 422, radar 460, one or more cameras 444, and so forth may be used to determine occupancy data 342. The occupancy data 342 may comprise information indicative that an area in the physical space 102 contains an obstacle 108 or is determined to be free from obstacles 108.

The AMD 104 may include one or more output devices 316. A motor 480 may be used to provide linear or rotary motion. A light 482 may be used to emit photons. A speaker 484 may be used to emit sound. A display 486 may comprise one or more of a liquid crystal display, light emitting diode display, electrophoretic display, cholesteric liquid crystal display, interferometric display, and so forth. The display 486 may be used to present visible information such as graphics, pictures, text, and so forth. In some implementations, the display 486 may comprise a touchscreen that combines a touch sensor and a display 486.

In some implementations, the AMD 104 may be equipped with a projector 488. The projector 488 may be able to project an image on a surface, such as the floor, wall, ceiling, and so forth.

A scent dispenser 490 may be used to emit one or more smells. For example, the scent dispenser 490 may comprise a plurality of different scented liquids that may be evaporated or vaporized in a controlled fashion to release predetermined amounts of each.

One or more moveable component actuators 492 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 492 to produce movement of the moveable component.

In other implementations, other 494 output devices may be utilized. For example, the AMD 104 may include a haptic output device that provides output that produces particular touch sensations to the user. Continuing the example, a motor 480 with an eccentric weight may be used to create a buzz or vibration to allow the AMD 104 to simulate the purr of a cat.

Figure 5:
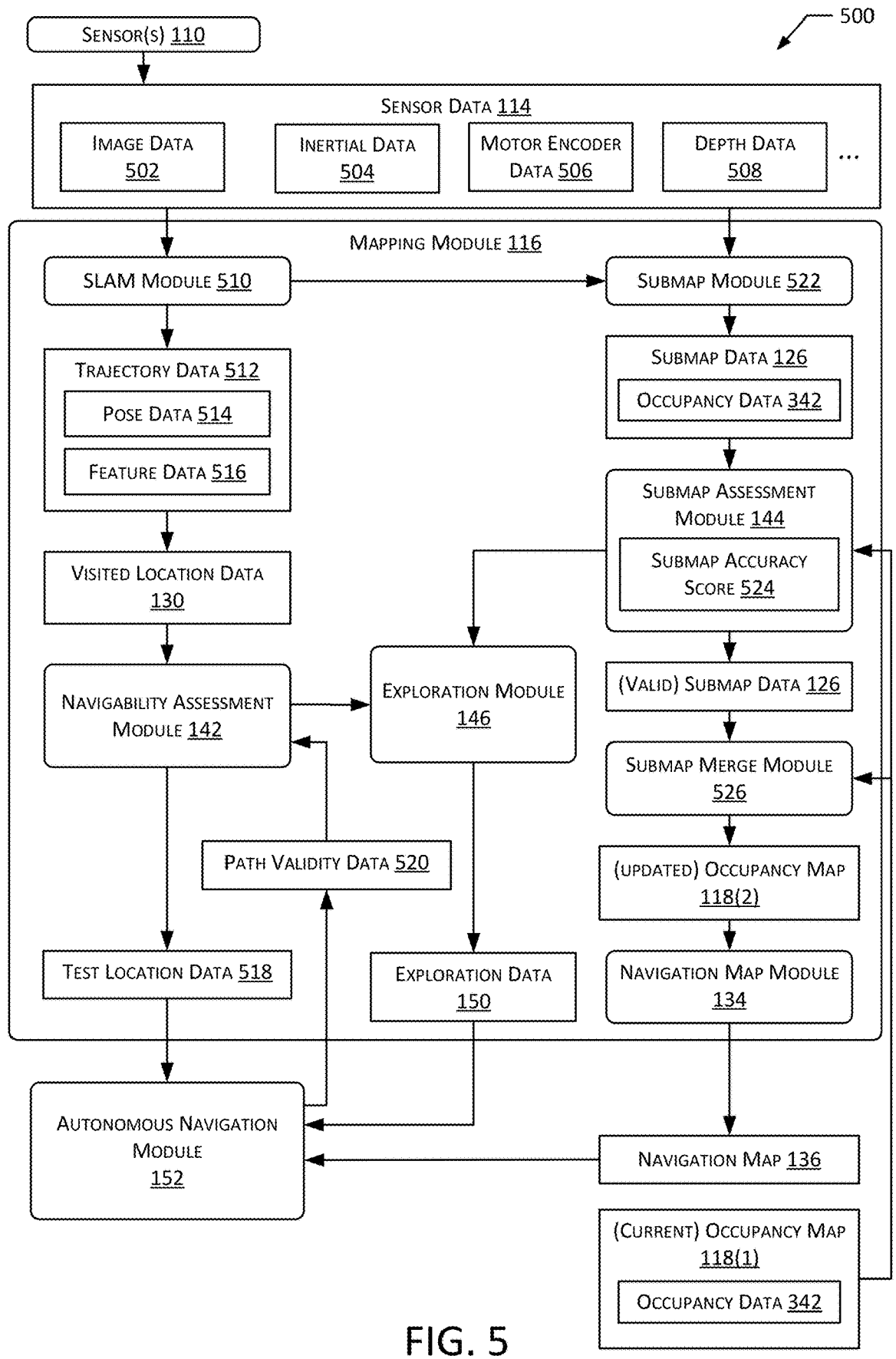
FIG. 5 illustrates a block diagram of a mapping module, according to some implementations.

FIG. 5 illustrates a block diagram 500 of the mapping module 116, according to some implementations. The sensors 110 on the AMD 104 provide sensor data 114. The sensor data 114 may include image data 502 acquired from one or more cameras 444. For example, a pair of red-green-blue (RGB) color cameras may be arranged on a common rigid structure to provide a stereocamera pair. The image data 502 may comprise the images produced by these cameras 444. The IMU comprising one or more gyroscopes 434 and accelerometers 436 may provide inertial data 504. For example, the IMU may be mounted to the chassis of the AMD 104, and provide inertial data 504 indicative of rotations and accelerations of the AMD 104 during movement. Motor encoder data 506 may be provided by a motor encoder 410. For example, a motor encoder 410 on the motor 480 used to rotate one of the drive wheels of the AMD 104 may provide motor encoder data 506 indicating a number and direction of rotations of the motor 480 shaft. Depth sensors such as ultrasonic sensors 418, optical sensors 420 such as a TOF depth camera, LIDAR 422, radar 460, and so forth may provide depth data 508 that is indicative of the presence or absence of obstacles 108 in the physical space 102 within the FOV 112 of the depth sensor. For example, a sensor 110 such as a TOF depth camera may emit a pulse of infrared light and use a detected return time for reflected light to determine a distance between the sensor and the object that reflected the light. The depth data 508 may be expressed as point cloud data, volumetric data, bearing and distance data, and so forth.

As described above, the mapping module 116 may include a SLAM module 510. The SLAM module 510 may accept as input the image data 502 and may also use other data such as the inertial data 504, the motor encoder data 506, and so forth. The SLAM module 510 may process the input to determine trajectory data 512. The trajectory data 512 may comprise pose data 514 indicative of poses. The poses may comprise data indicative of a location and rotations with respect to one or more axes based on the input. For example, the poses may be expressed as a 6D set of values. In some implementations the pose data 514 may include a confidence value. If the confidence value is below a threshold value, the pose data 512 may be discarded from consideration. For example, the pose data 514 may comprise pose data provided by the SLAM module 510 that has associated confidence values greater than the threshold value.

Each pose may be associated with feature data 516. For example, the feature data 516 may comprise information about the features 122 determined to be present in the image data 502 associated with that pose. For example, the image data 502 associated with the pose may be processed to determine one or more features 122, and those features 122 may be characterized to determine descriptors that are then stored as the feature data 516.

The visited location data 130 may be based on at least a portion of the trajectory data 512. For example, the trajectory data 512 may comprise pose data 514 and associated feature data 516 obtained every 5 cm. The visited location data 130 may comprise all of the poses indicated in the trajectory data 512, or a subset of those poses. Continuing the example, the visited location data 130 may comprise pose data 514 and feature data 516 for poses every 15 cm.

The navigability assessment module 142 accepts as input the visited location data 130. The navigability assessment module 142 may determine test location data 518. The test location data 518 may comprise a first visited location 128(1) as indicated in the visited location data 130 and a second visited location 128(2) as indicated in the visited location data 130. For example, the first visited location 128(1) may comprise the current location 132, a location of the docking station 106, and so forth. Continuing the example, the second visited location 128(2) may be selected from the remaining visited locations 128 in the visited location data 130.

The test location data 518 may be provided to the autonomous navigation module 152. A path planner module (not shown) may accept as input the test location data 518 and access one or more of the occupancy map 118 or the navigation map 136 and determine path validity data 520. The path validity data 520 comprises data indicative of whether or not a valid navigation path which would allow traversal of the AMD 104 has been determined. In some implementations the path validity data 520 may include additional information. For example, the path validity data 520 may include one or more of a path cost, a number of paths that were determined at this iteration, a number of paths previously determined, and so forth.

The path validity data 520 may be provided to the navigability assessment module 142. Based on the path validity data 520, the navigability assessment module 142 may determine if the visited locations 128 included in the test location data 518 are associated with a valid path or an invalid path. The navigability assessment module 142 may determine navigability data based at least in part on the path validity data 520. The navigability data may be indicative of a percentage or count of invalid locations with regard to a given area or distance traveled. For example, the navigability data may indicate that 8% of the visited locations 128 within a 1 meter segment of trajectory 124 are invalid.

The navigability assessment module 142 may provide data, such as the navigability data, to the exploration module 146. The exploration module 146 may determine exploration data 150 indicative of an exploration area 148. The exploration data 150 may be provided to the autonomous navigation module 152 which may then move the AMD 104 to a location within range of the sensors 110 of at least a portion of the exploration area 148.

The exploration module 146 may initiate an exploration that involves finding a navigable previously visited location 128 that is close to the previously visited locations 128 assessed as invalid, and gathering sensor data 114 of the previously visited location 128 that has been determined to not have a valid navigation path to it. For example, the exploration module 146 may determine a first previously visited location 128 that is within sensor range of at least a portion of the first area that includes the first set of locations that are assessed as invalid. A first orientation of the AMD 104 may be determined that would orient a sensor FOV 112 of the AMD 104 toward the at least a portion of the first area. The autonomous navigation module 152 may move the AMD 104 to the first location. One or more sensors 110 of the AMD 104 may be oriented to place the first location within the sensor FOV 112. Sensor data 114 may be acquired using the sensors 110 that provides information associated with at least a portion of the first area. The sensor data 114 may then be used to determine a second occupancy map 118(2) based at least in part on the sensor data 114. For example, the sensor data 114 and the proposed changes to the occupancy map 118 may be assessed as described in this disclosure. If they pass the assessment, the proposed changes may be used to update the occupancy map 118.

The mapping module 116 may include a submap module 522. The submap module 522 determines submaps 125 and associated submap data 126 that are indicative of an area in the physical space 102. In some implementations, the submap module 522 may use information from the SLAM module 510 to determine when to conclude a current submap 125 and establish a new submap 125.

The submap data 126 may comprise occupancy data 342 that provides information about the obstacles 108 which were in the FOV 112 of the depth sensors and detected by those depth sensors. The submap 125 may be associated with a particular pose in the pose data 514 in the trajectory data 512 and the other data provided by the SLAM module 510 and associated systems.

The mapping module 116 may include a loop closure module (not shown). The loop closure module determines that the AMD 104 has returned to about the same location as it previously had been. For example, the loop closure module may be comparing recently acquired feature data 516 with previously stored feature data 516 associated with previously visited locations 128. This comparison may include determining if more than a threshold number or count of features 122 having the same or similar descriptors have been detected. Once the determination is made that the AMD 104 has returned to about the same location, the loop closure module may perform the loop closure process. This loop closure process may include bundle adjustment or other functions that adjust previously stored trajectory data 512 and updates as appropriate.

In some implementations, the map assessment module 138 may perform one or more map assessments responsive to a loop closure event. For example, after loop closure the navigability assessment module 142 and the submap assessment module 144 may operate to assess at least a portion of the occupancy map 118 that was determined as a result of the loop closure.

The submap data 126 determined by the submap module 522 may be provided to the submap assessment module 144. The submap assessment module 144 compares the submap data 126 to a corresponding portion of a current occupancy map 118(1) to determine a submap accuracy score 524. The comparison may use occupancy data 342 indicative of observed occupied and observed unoccupied cells 120, while disregarding unknown or unobserved cells 120. The submap accuracy score 524 may be compared to a threshold value to determine if the submap data 126 is suitable for use in updating the current occupancy map 118(1). If the submap accuracy score 524 is below the threshold value, the submap data 126 may be disregarded and data may be provided to the exploration module 146 regarding the failed assessment. The exploration module 146 may determine an exploration area 148 that includes at least a portion of the submap 125 associated with the failed submap data 126. The exploration module 146 may determine exploration data 150 indicative of the exploration area 148. The exploration data 150 may be provided to the autonomous navigation module 152 which may then move the AMD 104 to a location within range of the sensors 110 of at least a portion of the exploration area 148.

If the submap data 126 is associated with a submap accuracy score 524 that is greater than or equal to the threshold value, the valid submap data 126 may be provided to a submap merge module 526. The submap merge module 526 may accept as input the valid submap data 126 and the current occupancy map 118(1). The submap merge module 526 may use the valid submap data 126 to update corresponding areas or cells 120 in the current occupancy map 118(1) to determine an updated occupancy map 118(2).

In one implementation, the submap assessment module 144 may operate to segregate a submap 125 into subsections. The subsections may then be scored. The submap 125 may thus be subdivided into additional submaps. For example, a first subsection of the submap 125 may be determined that encompasses the disagreement area 216 while a second subsection encompasses the remainder of the submap 125. The first subsection may be determined to have a submap accuracy score 524 that is less than the threshold value, and deemed invalid. The first subsection may be included within an exploration area 148. The second subsection may be determined to have a submap accuracy score 524 that is greater than or equal to the threshold value, and may be used to update the current occupancy map 118(1).

The updated occupancy map 118(2) may then be provided to the navigation map module 134. The navigation map module 134 may determine the navigation map 136 from the updated occupancy map 118(2). The autonomous navigation module 152 may use the navigation map 136 during operation. For example, the autonomous navigation module 152 may use the navigation map 136 to determine the path validity data 520 as described above.

In some implementations, one or more of the navigability assessment module 142 or the submap assessment module 144 may be used prior to other operations. For example, if the AMD 104 is scheduled to perform a task, before performing the task the AMD 104 may perform the assessment(s) to determine if the task is possible using the available occupancy map 118 or navigation map 136. For example, the navigability assessment module 142 may use test location data 518 associated with one or more locations associated with the task. If the assessment of the map fails, the AMD 104 may initiate exploration of the exploration area(s) 148 associated with the failed assessment in advance of the task. In this way, the AMD 104 may have an accurate map before attempting to perform the task.

Figure 6:
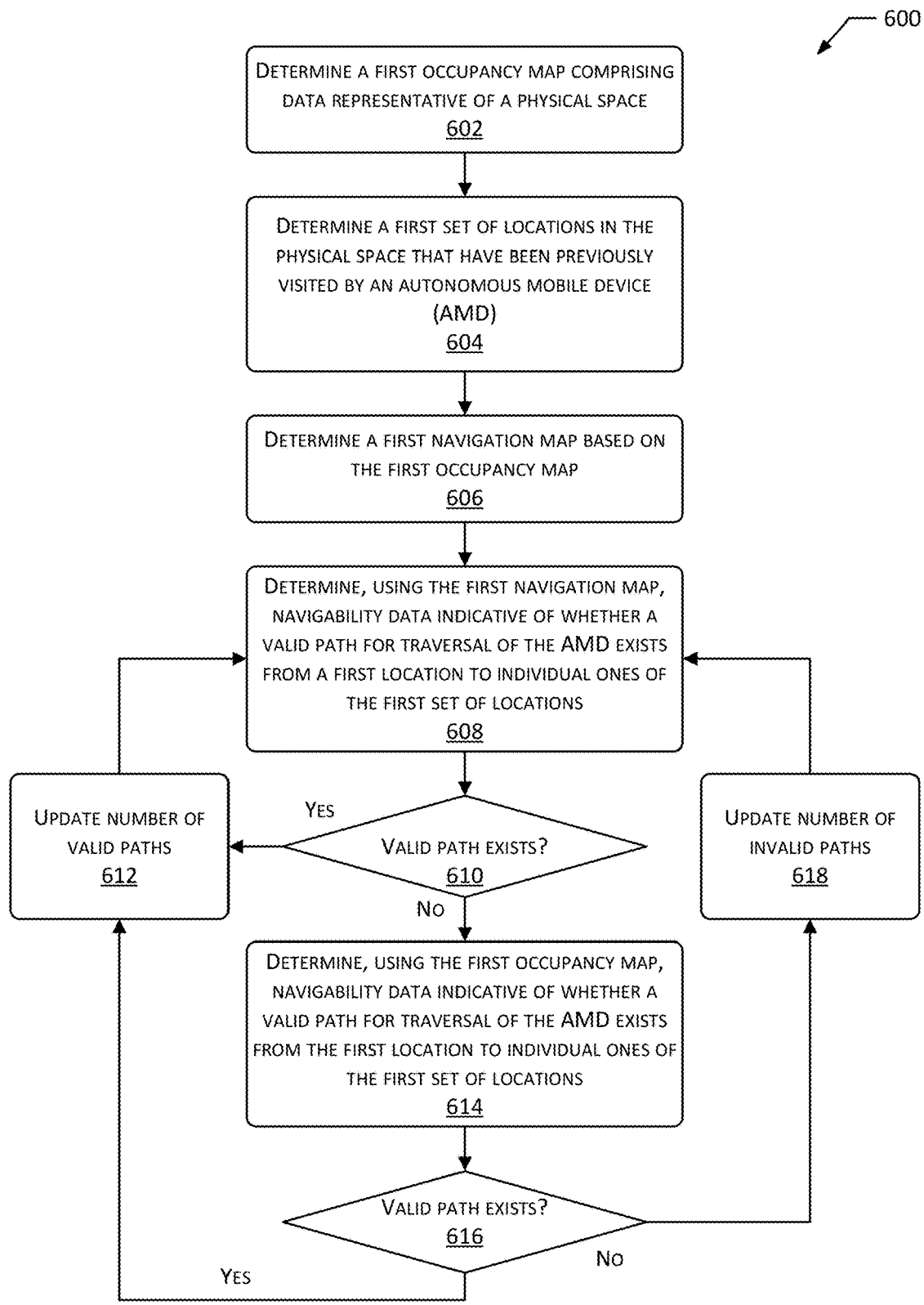
FIG. 6 is a flow diagram of a process for assessing a map based on navigability to previously visited locations, according to some implementations.

FIG. 6 is a flow diagram 600 of a process for assessing a map based on navigability to previously visited locations 128, according to some implementations. The process may be implemented at least in part by the navigability assessment module 142.

At 602, determine a first occupancy map 118(1) comprising data representative of a physical space 102. For example, the first occupancy map 118(1) may include occupancy data 342 indicative of whether a cell 120 is observed occupied, observed unoccupied, or unknown or unobserved.

At 604 determine a first set of locations in the physical space 102 that have been previously visited by the AMD 104. For example, the visited location data 130 indicative of previously visited locations 128 may be determined from the trajectory data 512.

At 606 a first navigation map 136(1) is determined using the first occupancy map 118(1). For example, the navigation map module 134 may determine the first navigation map 136(1).

At 608, using the first navigation map 136(1), navigability data indicative of whether a valid path for traversal of the AMD 104 exists from a first location in the physical space 102 to individual ones of locations in the first set of locations is determined. The navigability assessment module 142 may determine a first previously visited location 128(1) and a second previously visited location 128(2). In some implementations, the first previously visited location 128(1) may comprise a current location 132, location of the docking station 106, a designated location associated with testing, or another of the previously visited locations 128 in the visited location data 130. For example, the first previously visited location 128(1) and the second previously visited location 128(2) may be selected randomly from the visited location data 130.

The selection of a previously visited location 128 from the visited location data 130 may be subject to one or more constraints. These constraints may include, but are not limited to distance, time, confidence value, and so forth. For example, the locations selected for navigability assessment may be at least a minimum distance from one another, have a last visited timestamp that is at least a minimum time from one another or before a threshold time, and so forth. The minimum distance may be a straight line distance such as measured on the occupancy map 118, or a distance traveled by the AMD 104 along the actual trajectory 124 followed by the AMD 104. By constraining the selection of previously visited locations 128 for testing, the system may minimize unnecessary or unproductive testing. For example, assessing navigability between two previously visited locations 128 that are separated by 2 cm and were acquired within 500 ms of one another may not provide useful data in most circumstances. In comparison, assessing previously visited locations 128 that are separated by at least 2 meters and have not been visited within 10 minutes of one another may provide more useful navigability data.

In some implementations, the first set of locations may comprise a subset of the visited location data 130. For example, the first set of locations may be associated with a particular portion of the physical space 102. In another implementation, the first set of locations may be associated with an exploration area 148 specified by the submap assessment module 144.

In some implementations, one or more inflation parameters may be modified during the assessment process. For example, the process may iterate using successively lower inflation distances, until the inflation distance reaches zero and the first navigation map 136 is equivalent to the occupancy map 118.

At 610 a determination is made as to whether a valid path for traversal of the AMD 104 exists. If yes, the process may proceed to 612. At 612 a number of valid paths associated with the assessment may be updated, or other navigability data may be determined. Returning to 610, if no valid path exists the process may proceed to 614.

At 614, using the first occupancy map 118(1), navigability data indicative of whether a valid path for traversal of the AMD 104 exists from the first location in the physical space 102 to individual ones of locations in the first set of locations may be determined. As described above, the navigability assessment module 142 may determine a first previously visited location 128(1) and a second previously visited location 128(2). In some implementations, at 614 the same set of previously visited locations 128 may be assessed as used at 608.

At 616 a determination is made as to whether a valid path for traversal of the AMD 104 exists based on 614. If yes, the process may proceed to 612. If no valid path exists, the process may proceed to 618. At 618 a number of invalid paths associated with the assessment may be updated, or other navigability data may be determined.

Navigability data may be determined when the first set of locations have been processed. The navigability data may be indicative of one or more of: a percentage of locations in the first set of locations for which no valid path exists, a number of locations in the first set of locations for which no valid path exists, a number of locations in the first set of locations that are within a specified area for which no valid path exists, or a number of locations in the first set of locations for which no valid path exists that are associated with a specified distance previously traveled by the AMD 104. For example, the navigability data may indicate that, for the previously visited locations 128 that were assessed, 29 had valid paths and 4 had invalid paths, indicating a 12% failure rate. If the failure rate is greater than a threshold value, the exploration module 146 may generate exploration data 150 to explore at least a portion of the physical space 102. For example, the exploration area 148 that includes the first set of locations, excluding the first previously visited location 128(1), may be specified in exploration data 150.

Figure 7:
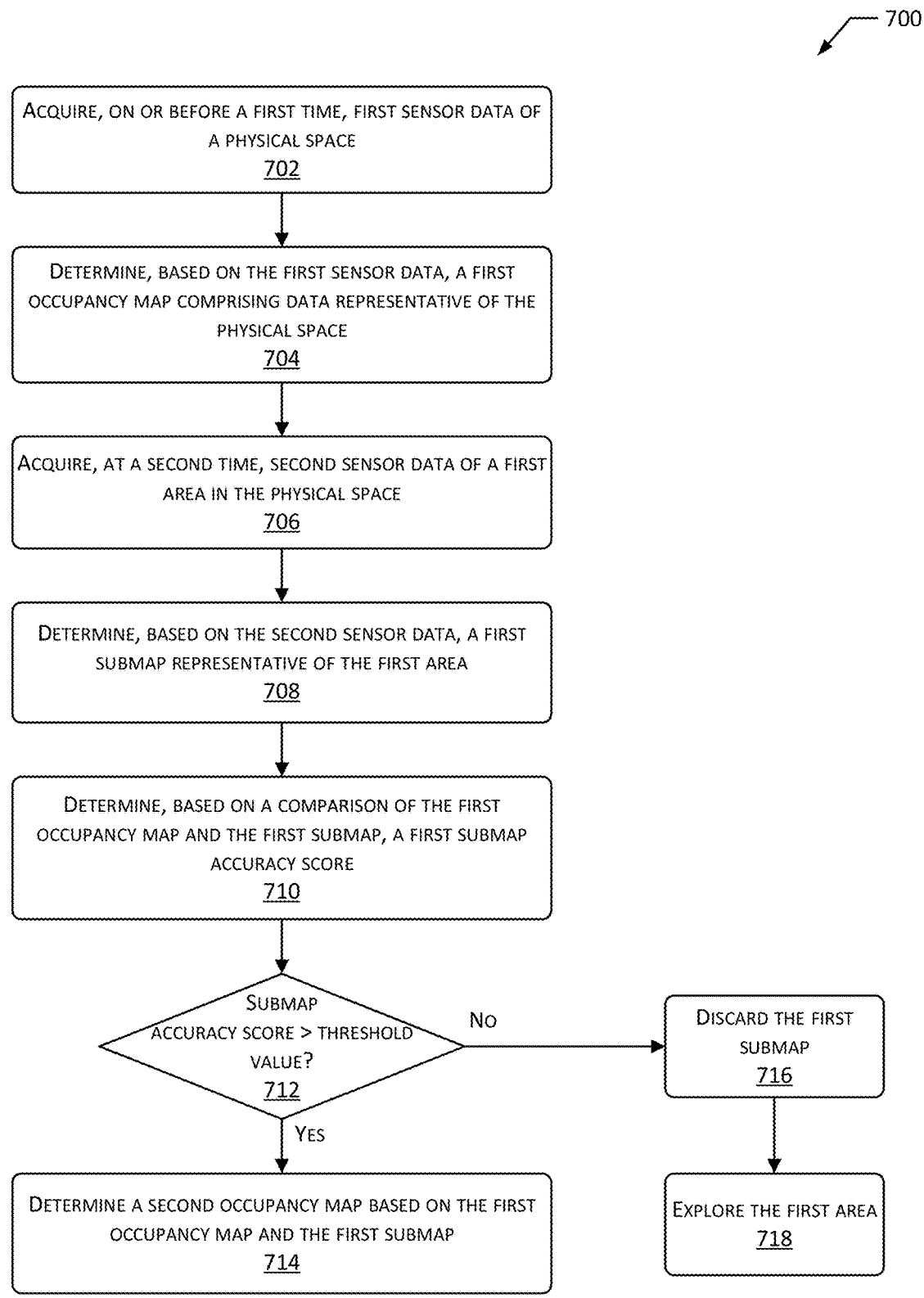
FIG. 7 is a flow diagram of a process for assessing submaps based on accuracy, according to some implementations.

FIG. 7 is a flow diagram 700 of a process for assessing submaps based on accuracy, according to some implementations. The process may be implemented at least in part by the submap assessment module 144.

At 702, on or before a first time, first sensor data 114(1) of the physical space 102 is acquired with one or more sensors 110 of the AMD 104.

At 704 based on the first sensor data 114(1), a first occupancy map 118 is determined that comprises data representative of the physical space 102.

At 706, at a second time that is after the first time, second sensor data 114(2) is acquired with the one or more sensors 110 of the AMD 104, of a first area in the physical space 102. For example, as the AMD 104 moves through the physical space 102, it may acquire sensor data 114.

At 708 based on the second sensor data 114(2), a first submap 125(1) representative of the first area is determined. For example, the submap module 522 may determine a new submap 125 every 5 cm of distance traveled by the AMD 104.

At 710, based on a comparison of the first occupancy map 118(1) and the first submap 125(1), a first submap accuracy score 524(1) is determined. For example, the first submap 125(1) may comprise a first cell 120(1) and the first occupancy map 118(1) may comprise a second cell 120(2) that are determined to be representative of a same area in the physical space 102. For example, the first submap 125(1) may be aligned to the first occupancy map 118(1) based on pose data 514 from the SLAM module 510. The first submap 125(1) and the first occupancy map 118(1) may each comprise occupancy data 342. For example, first occupancy data 342(1) may be associated with the first cell 120(1) that is indicative of the first cell 120(1) being occupied by an obstacle 108 or unoccupied by an obstacle 108. Continuing the example, second occupancy data 342(2) may be associated with the second cell 120(2) that is indicative of the second cell 120(2) being occupied by an obstacle 108 or unoccupied by an obstacle 108. Cells 120 that are unknown or unobserved may be disregarded during the determination of the submap accuracy score 524. The submap accuracy score 524 may be based at least in part on the first occupancy data 342(1) and the second occupancy data 342(2).

In one implementation, the following equations may be used to determine the submap accuracy score 524. In the following equations, the differences indicate a variation in occupancy data 342 for cells 120 that are determined to represent the same physical area. It is important to note that the submap 125 may be misaligned with respect to the occupancy map 118. In such a situation, the first cell 120(1) may be erroneously deemed to represent the same area in the physical space 102 as the second cell 120(2). In this situation, an inconsistency in the occupancy data 342 may be determined.

Let Occ_to_Occ represent a sum of a number of the cells 120 in the submap 125 that have occupancy data 342(1) indicative of an occupied cell in the submap 125 and occupancy data 342(2) indicative of an occupied cell in the occupancy map 118.

Let Free_to_Free represent a sum of a number of the cells 120 in the submap 125 that have occupancy data 342(1) indicative of an unoccupied or "free" cell in the submap 125 and occupancy data 342(2) indicative of an unoccupied cell in the occupancy map 118.

Let Occ_to_Free represent a sum of a number of the cells 120 in the submap 125 that have occupancy data 342(1) indicative of an occupied cell in the submap 125 and occupancy data 342(2) indicative of an unoccupied or free cell in the occupancy map 118.

Let Free_to_Occ represent a sum of a number of the cells 120 in the submap 125 that have occupancy data 342(1)

indicative of an unoccupied or "free" cell in the submap 125 and occupancy data 342(2) indicative of an occupied cell in the occupancy map 118.

The submap accuracy score 524 may then be calculated as follows:

$$\text{Submap Accuracy Score} = (Occ\_to\_Occ + Free\_to\_Free)/(Occ\_to\_Occ + Occ\_to\_Free + Free\_to\_Free + Free\_to\_Occ) \quad \text{EQUATION 1}$$

In other implementations other scoring functions may be used.

At 712 a determination is made as to whether the submap accuracy score 524 is greater than a threshold value. If yes, the process proceeds to 714.

At 714 the submap 125 and associated submap data 126 may be deemed sufficiently accurate to be used to update the occupancy map 118(2). For example, the submap merge module 526 may use the submap data 126 and the current occupancy map 118(1) to determine an updated occupancy map 118(2).

Returning to 712, if the submap accuracy score 524 is less than or equal to the threshold value, the process may proceed to 716. At 716 the first submap data 126(1) may be discarded from being incorporated into the occupancy map 118. The process may then proceed to 718. At 718 at least a portion of the first area associated with the first submap 125(1) may be explored. For example, the exploration module 146 may determine exploration data 150 to explore at least a portion of the first area in the physical space 102. The resulting sensor data 114 may be used to determine a new submap 125(2) which may be assessed.

Actual changes to the presence or placement of obstacles 108 in the physical space 102 may be sufficient to produce repeated failures of this assessment. In some implementations, data associated with failed assessments may be retained and subsequently used. For example, if the same area in the physical space 102 has been associated with at least a specified number of failed assessments within a specified period of time, the submap accuracy score 524 may be modified or disregarded. As a result, the submap data 126 may be used by the submap merge module 526 to update the occupancy map 118.

In some implementations, the processes described may be performed at least in part by one or more AMDs 104, servers, or other computing devices. For example, the submap data 126 may be stored and provided, at a later time, to a server. The server may generate various versions of the occupancy map 118 which omit the submap data 126 for a submap 125 that is being tested. These versions of the occupancy map 118 may then be used to test particular submaps 125 as represented by submap data 126. Continuing the example, the submap assessment module 144 may operate as an offline process. Once complete, the resulting occupancy map 118 as updated with submap data 126 deemed valid may be provided to the AMD 104 for use.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, performed by one or more processors, comprising:
    determining a first occupancy map comprising data representative of a physical space;
    determining a first location in the physical space that has been previously visited by an autonomous mobile device (AMD);
    determining, using the first occupancy map, navigability data that indicates no navigation path, without obstacles or obstructions, exists for traversal from a second location in the physical space to the first location;

determining, based on the navigability data and the first location, a first area to be explored;

moving the AMD to a third location that is within a first distance of at least a portion of the first area; and acquiring, with one or more sensors of the AMD, sensor data about the at least a portion of the first area.

2. The method of claim 1, further comprising one or more of:

determining a fourth location that the AMD was previously present at before a particular time; or determining a fifth location that is at least a second distance traveled by the AMD from a current location of the AMD.

3. The method of claim 1, wherein the navigability data comprises one or more of:

a percentage of previously visited locations for which no navigation path, without obstacles or obstructions, exists to those locations, a number of previously visited locations for which no navigation path, without obstacles or obstructions, exists, a number of previously visited locations, that are within a second area, for which no navigation path, without obstacles or obstructions, exists, or a number of previously visited locations for which no navigation path, without obstacles or obstructions, exists, wherein the previously visited locations are within a second distance previously traveled by the AMD.

4. The method of claim 1, further comprising:

determining a navigation map based on the first occupancy map, wherein a first obstacle as represented in the first occupancy map has a first size and the first obstacle as represented in the navigation map has a second size that is greater than the first size; and wherein the determining the navigability data is based on the navigation map.

5. The method of claim 1, wherein the acquiring the sensor data about the at least a portion of the first area comprises:

determining the third location that is within the first distance of the at least a portion of the first area, wherein the first distance is a range of a sensor of the AMD;

determining a first orientation that orients a sensor field of view (FOV) of the sensor toward the at least a portion of the first area; and orienting the sensor of the AMD to place the third location within the FOV; and the method further comprising:

determining a second occupancy map based at least in part on the sensor data.

6. The method of claim 1, wherein:

the first area comprises an area that is centered on the third location and extends a second distance from the third location.

7. The method of claim 1, further comprising, for a previously visited location:

acquiring an image;

determining a set of one or more features depicted in the image; and associating the previously visited location with the set of one or more features.

8. The method of claim 1, wherein the first occupancy map comprises a plurality of cells, wherein each cell is associated with an area in the physical space, and further wherein each cell comprises visited location data indicative of whether the AMD has been within the area of the physical space represented by that cell; and selecting one or more of the plurality of cells in which the visited location data is indicative of the AMD having been within the area of the physical space represented by that cell.

9. The method of claim 1, further comprising:

determining a second occupancy map comprising data representative of the physical space;

determining, using the second occupancy map, a first navigation path without obstacles or obstructions for traversal Ly the AMD from the second location to a fourth location;

determining, based on the first navigation path and the first occupancy map, a second area within which the first navigation path intersects one or more obstacles as indicated by the first occupancy map; and wherein the first area includes at least the second area.

10. The method of claim 1, further comprising:

determining, before a first time, a first set of submaps of the physical space wherein each submap comprises a plurality of cells, wherein each cell is associated with an area in the physical space, and further wherein each cell is associated with occupancy data indicative of whether an obstacle is present, not present, or unknown;

determining, based on the first set of submaps, the first occupancy map;

determining, at a second time after the first time, a first submap representative of the at least a portion of the first area;

determining, based on a comparison of the occupancy data of the first submap and the first occupancy map, a submap accuracy score;

determining the submap accuracy score is less than a threshold value;

disregarding the first submap; and wherein the determining the first area is further based on the submap accuracy score.

11. A method, performed by one or more processors, comprising:

acquiring, on or before a first time, first sensor data of a physical space with one or more sensors of an autonomous mobile device (AMD);

determining, based on the first sensor data, a first occupancy map comprising data representative of the physical space;

acquiring with the one or more sensors of the AMD, at a second time that is after the first time, second sensor data of a first area that is within the physical space;

determining, based on the second sensor data, a first submap representative of the first area;

determining, based on a comparison of the first occupancy map and the first submap, a first submap accuracy score;

determining, based on the first submap accuracy score, that the first submap is inaccurate; and responsive to the determining that the first submap is inaccurate, exploring at least a portion of the first area.

12. The method of claim 11, further comprising:

disregarding data associated with the first submap; and wherein the exploring the at least a portion of the first area comprises:

acquiring with the one or more sensors of the AMD, at a third time that is after the second time, third sensor data of the first area;

determining, based on the third sensor data, a second submap representative of the at least a portion of the first area;

determining, based on a comparison of the first occupancy map comprising data representative of the physical space and the second submap, a second submap accuracy score;

determining the second submap accuracy score is greater than a threshold value; and determining a second occupancy map based on the first occupancy map and the second submap.

13. The method of claim 11, wherein the first submap comprises a first cell and the first occupancy map comprises a second cell; and the method further comprising:

determining the first cell and the second cell are representative of a same area in the physical space;

determining first occupancy data associated with the first cell, wherein the first occupancy data is indicative of the same area in the physical space represented by the first cell being occupied by an obstacle or unoccupied by an obstacle;

determining second occupancy data associated with the second cell, wherein the second occupancy data is indicative of the same area in the physical space represented by the second cell being occupied by an obstacle or unoccupied by an obstacle; and wherein the first submap accuracy score is based at least in part on the first occupancy data and the second occupancy data.

14. The method of claim 11, wherein the first occupancy map comprises a first plurality of cells and the first submap comprises a second plurality of cells, wherein the first plurality is greater than the second plurality; and wherein the first submap accuracy score is based on data indicative of whether an area in the physical space represented by a cell has been determined to be occupied by an obstacle or determined to be unoccupied by an obstacle.

15. The method of claim 11, further comprising:

determining a first set of locations comprising locations in the physical space that have been previously visited by the AMD;

determining, using the first occupancy map, navigability data indicative of whether a navigation path, without obstacles or obstructions, exists for traversal from a first location in the physical space to individual ones of the first set of locations;

determining, based on the navigability data and the first set of locations, a second area; and acquiring, with the one or more sensors of the AMD, third sensor data about at least a portion of the second area.

16. The method of claim 11, further comprising:

determining, before the second time, a first path plan indicative of a first path from a first location in the physical space to a second location in the physical space;

moving, before the second time, the AMD along the first path wherein the first area includes at least a portion of the first path;

responsive to the determining the first submap is inaccurate, stopping movement of the AMD along the first path;

disregarding data about the first area that is associated with the first submap;

acquiring with the one or more sensors of the AMD, at a third time that is after the second time, third sensor data of the first area;

determining, based on the third sensor data, a second submap representative of the at least a portion of the first area;

determining, based on a comparison of the first occupancy map and the second submap, a second submap accuracy score;

determining, based on the second submap accuracy score, the second submap is accurate;

determining a second occupancy map based on the first occupancy map and the second submap;

determining, using the second occupancy map, a second path plan indicative of a second path from the first location to the second location; and moving the AMD along the second path.

17. A method, performed by one or more processors, comprising:

determining, based on first sensor data, a first occupancy map comprising data representative of a physical space;

determining, based on second sensor data, a first submap representative of a first area that is a portion of the physical space;

determining, based on a comparison of the first occupancy map and the first submap, a first score;

comparing the first score to a threshold value; and responsive to the first score being less than the threshold value, exploring at least a portion of the first area.

18. The method of claim 17, performed by the one or more processors, further comprising:

determining, based on the first score being less than the threshold value, that the first submap is inaccurate; and wherein the exploring the at least a portion of the first area comprises:

sending, to an autonomous mobile device (AMD), instructions to acquire third sensor data about the at least a portion of the first area;

determining, based on the third sensor data, a second submap representative of the at least a portion of the first area;

determining, based on the first occupancy map and the second submap, a second score;

determining the second score is greater than the threshold value; and determining a second occupancy map based on the first occupancy map and the second submap.

19. The method of claim 17, wherein the first occupancy map comprises a first cell and the first submap comprises a second cell; and the method further comprising:

determining the first cell and the second cell are representative of a same area in the physical space;

determining first occupancy data associated with the first cell, wherein the first occupancy data is indicative of the same area in the physical space represented by the first cell being occupied by an obstacle or unoccupied by an obstacle;

determining second occupancy data associated with the second cell, wherein the second occupancy data is indicative of the same area in the physical space represented by the second cell being occupied by an obstacle or unoccupied by an obstacle; and wherein the first score is based at least in part on the first occupancy data and the second occupancy data.

20. The method of claim 17, further comprising:
determining a first location in the physical space and a second location in the physical space that have been previously visited by one or more autonomous mobile devices (AMDs);
determining, using the first occupancy map, that no navigation path, without obstacles or obstructions, exists from the first location to the second location;
determining a second area that is associated with the second location; and
sending, to an AMD, instructions to acquire sensor data of the second area.

* * * * *

UNITED STATES PATENT AND TRADEMARK OFFICE
CERTIFICATE OF CORRECTION

PATENT NO. : 11,274,930 B1  
APPLICATION NO. : 16/710935  
DATED : March 15, 2022  
INVENTOR(S) : Madhivanan et al.

Page 1 of 1

It is certified that error appears in the above-identified patent and that said Letters Patent is hereby corrected as shown below:

In the Claims  
Column 36, Claim 9, Line 12:  
Currently reads "traversal Ly the AMD"  
Where it should read --traversal by the AMD--.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*